(12) United States Patent
Takeda et al.

(10) Patent No.: US 11,191,062 B2
(45) Date of Patent: Nov. 30, 2021

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/323,873

(22) PCT Filed: Aug. 8, 2017

(86) PCT No.: PCT/JP2017/028800
§ 371 (c)(1),
(2) Date: Feb. 7, 2019

(87) PCT Pub. No.: WO2018/030416
PCT Pub. Date: Feb. 15, 2018

(65) Prior Publication Data
US 2019/0215824 A1  Jul. 11, 2019

(30) Foreign Application Priority Data

Aug. 10, 2016  (JP) .............................. JP2016-157994

(51) Int. Cl.
*H04W 72/04*  (2009.01)
*H04L 27/26*  (2006.01)
*H04L 5/00*  (2006.01)

(52) U.S. Cl.
CPC ....... *H04W 72/0413* (2013.01); *H04L 5/0007* (2013.01); *H04L 5/0048* (2013.01);
(Continued)

(58) Field of Classification Search
CPC .............. H04W 72/0413; H04W 72/04; H04L 5/0007; H04L 5/0048; H04L 27/26; H04L 27/2647
See application file for complete search history.

(56) References Cited

U.S. PATENT DOCUMENTS

2012/0320880 A1   12/2012  Han et al.
2013/0223396 A1*   8/2013  Han .................. H04W 72/0413
                                                  370/329
(Continued)

FOREIGN PATENT DOCUMENTS

EP         2512083 A2    10/2012

OTHER PUBLICATIONS

International Search Report issued in PCT/JP2017/028800 dated Oct. 31, 2017 (2 pages).
(Continued)

*Primary Examiner* — Eric Myers
(74) *Attorney, Agent, or Firm* — Osha Bergman Watanabe & Burton LLP

(57) ABSTRACT

The present invention is designed to transmit uplink control information (UCI) by using UL control channels that are suitable for the requirements of user terminals in future radio communication systems. A user terminal, according to the present invention, has a transmission section that transmits uplink control information (UCI) by using an uplink (UL) control channel, and a control section that controls transmission of the UCI, and the structure of the UL control channel is selected from a plurality of structures that contain different numbers of symbols.

10 Claims, 20 Drawing Sheets

(52) U.S. Cl.
CPC .......... *H04L 27/26* (2013.01); *H04L 27/2647* (2013.01); *H04W 72/04* (2013.01)

(56) References Cited

U.S. PATENT DOCUMENTS

| | | | |
|---|---|---|---|
| 2017/0215206 A1* | 7/2017 | Cheng | H04W 16/14 |
| 2018/0270011 A1* | 9/2018 | Yang | H04B 7/0626 |
| 2019/0132102 A1* | 5/2019 | Kwak | H04L 5/0048 |
| 2019/0230647 A1* | 7/2019 | Yang | H04J 13/18 |

OTHER PUBLICATIONS

Written Opinion of the International Searching Authority issued in PCT/JP2017/028800 dated Oct. 31, 2017 (3 pages).
Ericsson; "Physical layer aspects for PUCCH for short TTI"; 3GPP TSG RAN WG1 Meeting #84 bis, R1-163321 Busan; Apr. 11-15, 2016 (3 pages).
3GPP TS 36.300 V8.12.0; "3rd Generation Partnership Project; Technical Specification Group Radio Access Network Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Office Action issued in the counterpart European Patent Application No. 17839486.2, dated Aug. 28, 2020 (8 pages).
Extended European Search Report issued in counterpart European Patent Application No. 17839486.2, dated Apr. 2, 2020 (11 pages).
LG Electronics; "Discussion on PUCCH design for HARQ-ACK in shortened TTI"; 3GPP TSG RAN WG1 Meeting #84bis, R1-162507; Busan, Korea; Apr. 11-15, 2016 (7 pages).
LG Electronics; "Support different TTI length for data channels and PUCCH"; 3GPP TSG RAN WG1 Meeting #84bis, R1-163101; Busan, Korea; Apr. 11-15, 2016 (5 pages).
Intel Corporation; "Uplink Reference Signal Design for Short TTI"; 3GPP TSG RAN WG1 Meeting #84, R1-160864; St Julian's, Malta; Feb. 15-19, 2016 (4 pages).
Ahmadi, S.; "LTE-Advanced: A Practical Systems Approach to Understanding 3GPP LTE Releases 10 and 11 Radio Access Technologies"; Elsevier Science & Technology, Jan. 1, 2014, pp. 774-802 (31 pages).
Office Action issued in Chinese Application No. 201780049362.1; dated May 21, 2021 (13 pages).

* cited by examiner

UL CONTROL CHANNEL (FIRST UL CONTROL CHANNEL STRUCTURE)

UL CONTROL CHANNEL (SECOND UL CONTROL CHANNEL STRUCTURE)

| UCI of UE1 | UCI of UE2 | UCI of UE3&UE4 (CDM) |

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower delays and so on (see non-patent literature 1). In addition, successor systems of LTE are also under study for the purpose of achieving further broadbandization and increased speed beyond LTE (referred to as, for example, "LTE-A (LTE-Advanced)," "FRA (Future Radio Access)," "4G," "5G," "5G+(plus)," "NR (New RAT)," "LTE Rel. 14," "LTE Rel. 15 (or later versions)," and so on).

In existing LTE systems (for example, LTE Rel. 10 and later versions), carrier aggregation (CA) to integrate a number of carriers (component carriers (CCs), cells, and so forth) is introduced in order to achieve broadbandization. Each carrier is configured with the system bandwidth of LTE Rel. 8 as one unit. In addition, in CA, a number of CCs under the same radio base station (eNB (eNodeB)) are configured in a user terminal (UE (User Equipment)).

Meanwhile, in existing LTE systems (for example, LTE Rel. 12 and later versions), dual connectivity (DC), in which a number of cell groups (CGs) formed by different radio base stations are configured in a user terminal, is also introduced. Each cell group is comprised of at least one cell (CC, cell, and so forth). In DC, since a number of CCs of different radio base stations are integrated, DC is also referred to as "inter-eNB CA."

Also, in existing LTE systems (for example, LTE Rel. 8 to 13), downlink (DL) communication and/or uplink (UL) communication are performed using 1-ms transmission time intervals (TTIs) (also referred to as "subframes" and so on). This 1-ms TTI is the unit of time it takes to transmit one channel-encoded data packet, and is the processing unit in, for example, scheduling, link adaptation, retransmission control (HARQ-ACK (Hybrid Automatic Repeat reQuest ACKnowledgment)) and so on.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

There is an expectation that future radio communication systems (for example, 5G, NR, and so forth) will accommodate various services such as high-speed, large-capacity or high-throughput communication such as eMBB (enhanced Mobile Broad Band), massive access (mMTC (massive MTC)) from devices (user terminals) for machine-to-machine communication (M2M) such as IoT (Internet of Things) and MTC (Machine-Type Communication), and low-latency and highly reliable communication such as URLLC (Ultra-Reliable and Low Latency Communication), in a single framework. URLLC is required to provide a higher latency-reducing effect than eMBB and mMTC.

In this way, for future radio communication systems where a high latency-reducing effect is required, a study is in progress to support a UL control channel that is formed with a smaller number of symbols (for example, one or two symbols) than UL control channels (for example, PUCCH (Physical Uplink Control CHannel) format 1 to 5) used in existing LTE system.

Meanwhile, there is a likelihood that, in future radio communication systems, there will be a number of user terminals that use services with different requirements (regarding, for example, latency reduction, coverage, throughput, and so forth). Therefore, when a UL control channel of a fixed structure is applied to a number of user terminals having different requirements, the individual requirements of each of these user terminals may not be fulfilled.

The present invention has been made in view of the above, and it is therefore an object of the present invention to provide a user terminal and a radio communication method, whereby uplink control information (UCI) can be transmitted by using UL control channels that suit the requirements, in future radio communication systems.

Solution to Problem

According to one aspect of the present invention, a user terminal has a transmission section that transmits uplink control information (UCI) by using an uplink (UL) control channel, and a control section that controls transmission of the UCI, and the structure of the UL control channel is selected from a plurality of structures that contain different numbers of symbols.

Advantageous Effects of Invention

According to the present invention, uplink control information (UCI) can be transmitted using UL control channels that suit the requirements of user terminals in future radio communication systems.

DESCRIPTION OF EMBODIMENTS

Future radio communication systems (5G/NR) are under research to introduce a number of frame structures (also referred to as "frame types," "channel structures," "subframe structures," "subframe types," "slot structures," "slot types," and so on).

Figure 1:
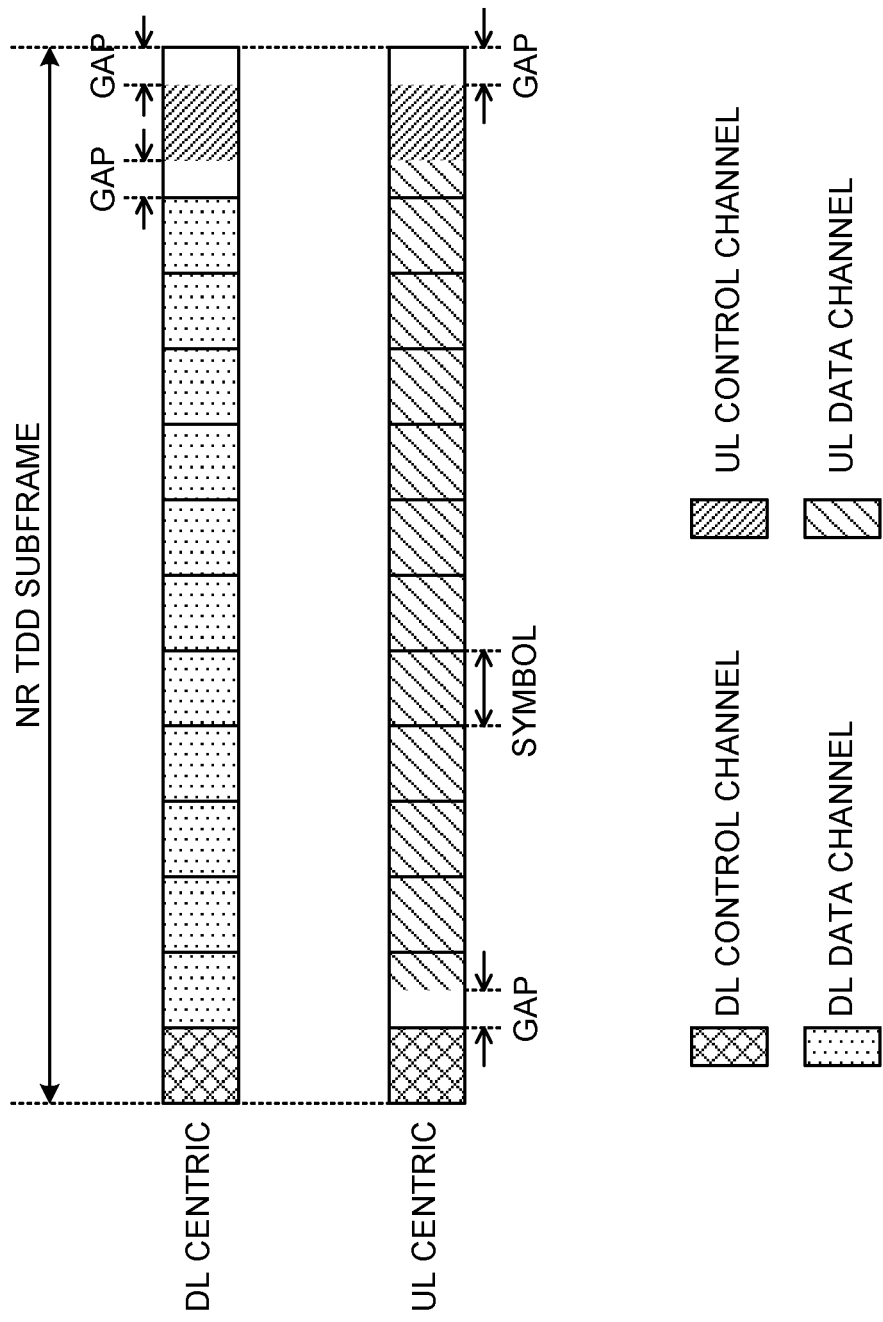
FIG. 1 is a diagram to show an example of a frame structure for use in future radio communication systems.

FIG. 1 is a diagram to show an example of a frame structure (here, time structure) for future radio communication systems. Note that the frame structure shown in FIG. 1 is simply an example, and the specific configurations of frame structures that are applicable to the present embodiment, the number of such structures and so forth are by no means limited to the example shown in FIG. 1.

FIG. 1 shows an example of dividing between different channels in the time domain, but this frame structure is in no respect limiting. For example, a DL data channel (also referred to as a "DL shared channel" and so on) and a DL control channel do not necessarily have to be divided in time, and may be frequency-multiplexed/code-multiplexed over the same time period (for example, the same symbol). Also, the same holds with an uplink data channel (also referred to as a "UL shared channel" and so on) and an uplink control channel, which do not necessarily have to be divided in the time domain, and which may be frequency-multiplexed/code-multiplexed over the same time period (for example, the same symbol).

For example, referring to FIG. 1, a DL data channel can be transmitted by using a frame structure, in which a DL control channel, a DL data channel and a UL control channel are arranged (and which is also referred to as "DL centric" and so forth). A user terminal controls receipt of the DL data channel based on downlink control information (DCI) that is transmitted in the DL control channel.

Also, the user terminal can feed back retransmission control information (also referred to as "HARQ-ACK (Hybrid Automatic Repeat reQuest-ACKnowledgment)," "ACK" or "NACK" ("ACK/NACK") and so on) in response to the DL data channel via the UL control channel in the same time period (also referred to as, for example, "NR TDD subframe," "transmission time interval (TTI)," "subframe" and so on). Note that the user terminal can also feed back this HARQ-ACK in the UL control channel or the UL data channel provided in a subsequent time period.

Also, as shown in FIG. 1, a time for switching DL and UL (gap period) may be provided between the DL data channel and the UL control channel and/or between the DL control channel and the UL data channel. Also, a time to switch UL and DL (gap period) may be also provided between the UL control channel and the time the next frame (subframe or TTI) starts.

Alternatively, it is possible to design the channel structure per se so that no explicit time for switching UL and DL (gap period) is provided between the UL control channel and the time the next frame (subframe or TTI) starts, and, in its actual operation, provide a time for switching UL and DL (gap period) in this period, based on timing advance (TA) that is applied to UL signals. In this case, the gap period between the DL data channel and the UL control channel and/or between the DL control channel and the UL data channel, shown in FIG. 1, may be comprised of an integer number of symbols, such as one symbol, two symbols, three symbols and so on.

In this way, to enable short-term communication, allocation may be carried out so that control of transmission/receipt (scheduling) is complete within the same subframe. This type of allocation is also referred to as "self-contained assignment." Subframes that are subject to self-contained assignment may be referred to as "self-contained subframes." Self-contained subframes may be also referred to as "self-contained TTIs" or "self-contained symbol sets," or other names may be used as well.

In self-contained subframes, the user terminal may receive the DL data channel based on the DL control channel, and transmit an HARQ-ACK in response to the DL data channel. The use of self-contained subframes can realize feedback with ultra-low delay of 1 ms or less, for example, so that the latency can be reduced.

Furthermore, to transmit a UL data channel, a frame structure, in which a DL control channel, a UL data channel, and a UL control channel are arranged (and which is referred to as "UL centric" and so forth) can be used. Based on DCI that is transmitted in a DL control channel, the user terminal can transmit UL signals (UL data, measurement report, and so forth) in the same (or the next or a later) subframe.

In a frame structure to arrange a number of channels, the order in which the channels are arranged, the length of each channel in the time direction, and so on are not limited to those of the structure shown in FIG. 1. The locations of individual channels can be switched as appropriate. For example, the areas for placing the control channels may be changed, or the length of gap periods may be changed.

FIG. 2 provide diagrams to show examples of frame structures for use in future radio communication systems.

Figure 2A:
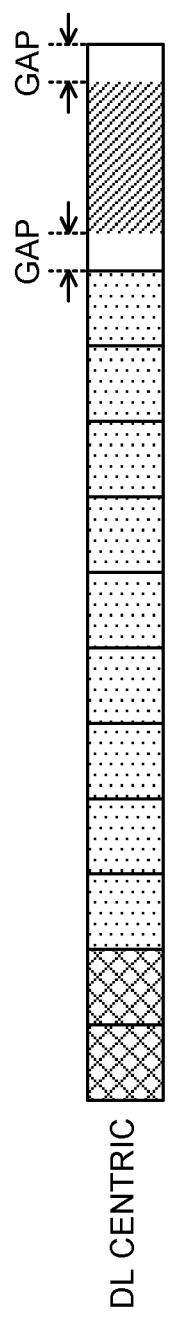
FIGS. 2A and 2B are diagrams to show other examples of frame structures for use in future radio communication systems.
Figure 2A:
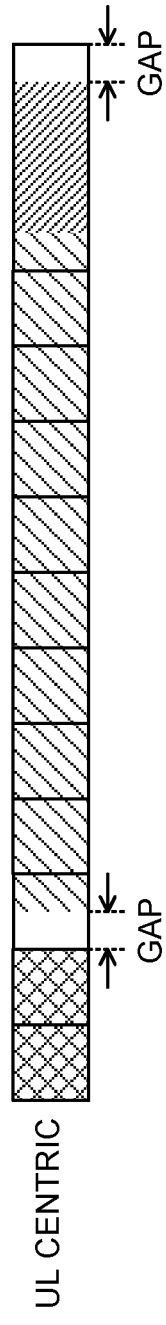

FIG. 2A shows a frame structure in which the fields for placing the DL control channel and the UL control channel are expanded. By expanding the field for placing the DL control channel, the capacity of DCI that can be transmitted in one time interval (for example, one subframe, one TTI and so forth) can be increased. Also, by expanding the period of time (for example, the number of symbols) to place the UL control channel, even in the uplink where transmission power is limited, the quality that is required when transmitting an uplink control signal consisting of a predetermined number of bits can be readily achieved.

Figure 2B:
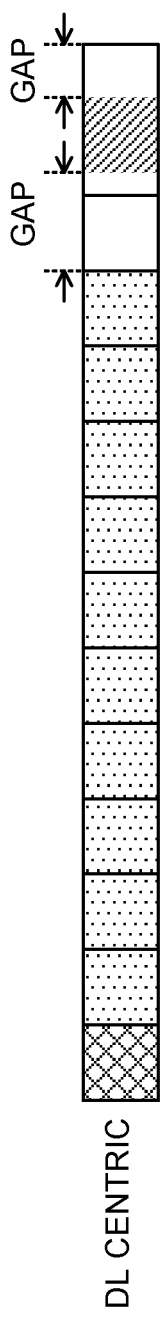
Figure 2B:
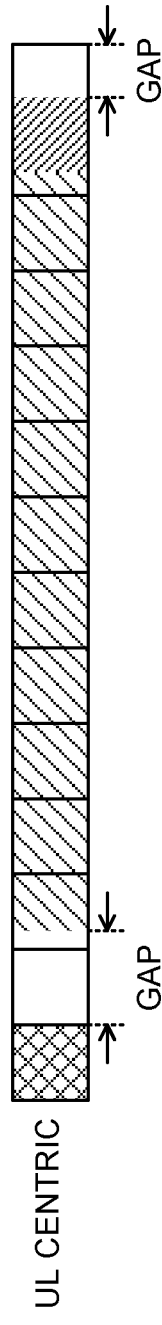

FIG. 2B shows a frame structure in which the gap period is expanded. By providing longer gap periods, it is possible to reserve the processing time it takes to expand the coverage, and/or the processing time that is needed after data is received in the DL data channel, until the UL control channel is transmitted, or after the DL control channel is received, until the UL data channel is transmitted, so that longer processing time becomes available for use.

In this way, future radio communication systems (5G/NR) are under study to introduce frame structures, in which a period of time for making DL communication and a period of time for making UL communication are provided in a predetermined time interval (for example, a subframe).

Now, UL control channels (PUCCH formats 1 to 5) in existing LTE systems are transmitted in all symbols in a subframe (for example, fourteen symbols when normal cyclic prefixes (CPs) are used.

Figure 3A:
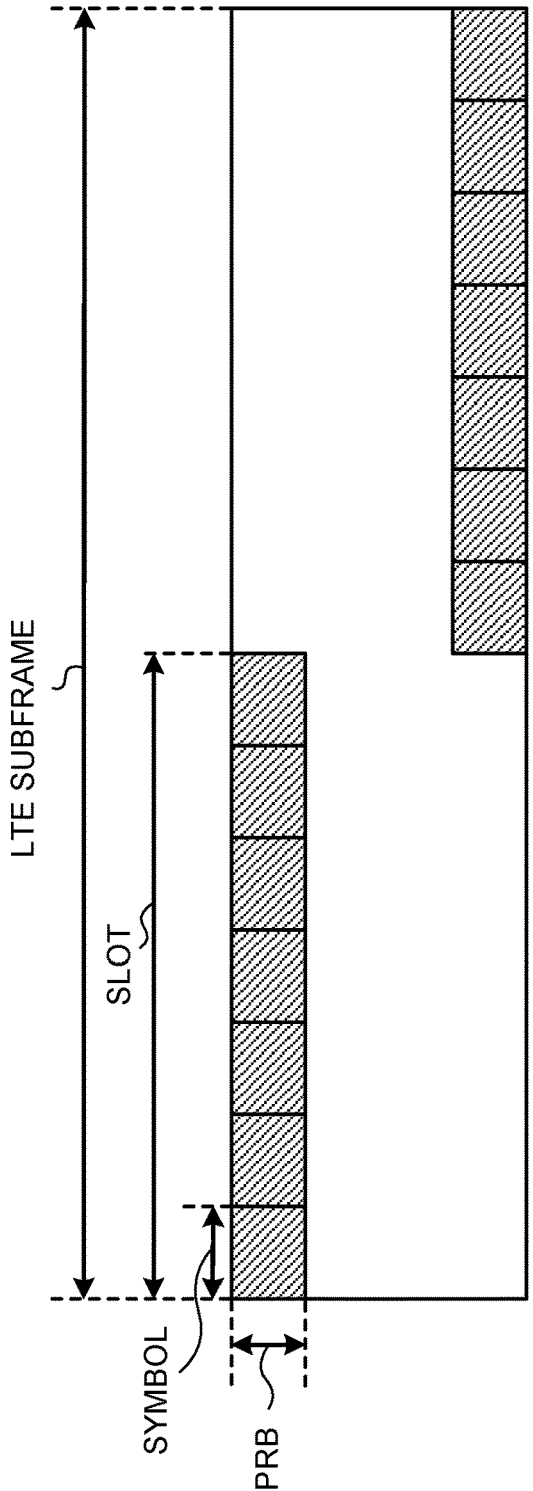
FIGS. 3A and 3B are diagrams to show examples of UL control channel structures.

FIG. 3 provide diagrams to show examples of UL control channel structures. As shown in FIG. 3A, UL control channels (PUCCH format 1 to 3 and 5) for existing LTE systems are mapped to one resource block (also referred to as an "RB," a "PRB (Physical Resource Block)," and so forth) that is subject to frequency hopping across slots, over all symbols in a subframe.

Meanwhile, for future radio communication systems (for example, 5G, NR and so forth), research is underway to transmit a UL control channel by using fewer symbols (for example, one or two symbols) than for UL control channels of existing LTE systems.

Figure 3B:
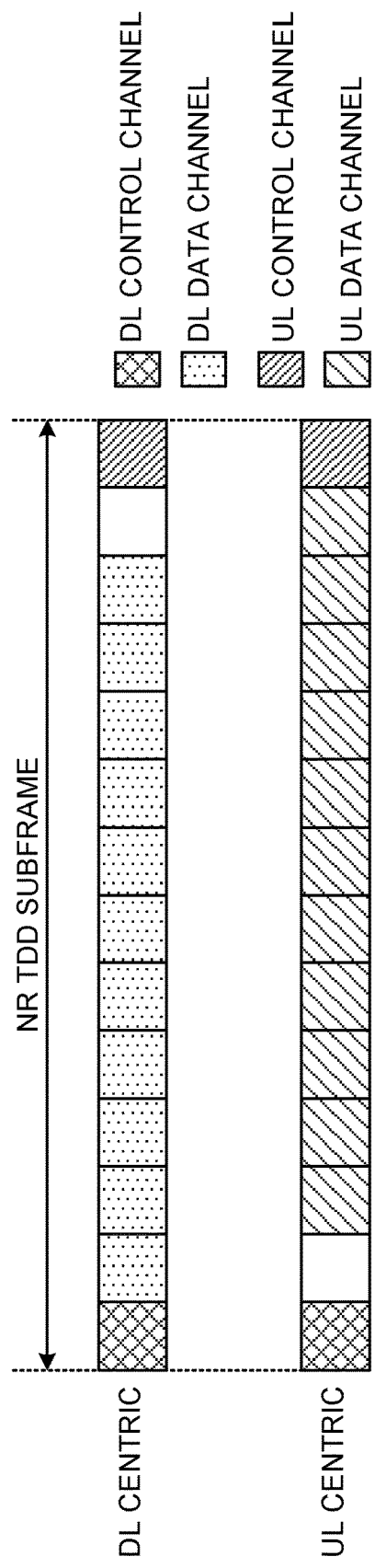

For example, in FIG. 3B, a UL control channel is transmitted in the last one symbol in a subframe. As shown in FIG. 3B, in order to expand the coverage of UL (hereinafter abbreviated as "UL coverage") in future radio communication systems where at least one of a DL control channel, a UL control channel and a data channel (a DL data channel or a UL data channel) can be time-division-multiplexed, it is possible to increase the number of symbols where a UL control channel is mapped in a subframe. Note that, at this time, the amount of frequency resources (for example, the number of PRBs) in the symbols where the UL control channel is mapped is reduced, so that the power density of transmitting signals can be increased, and therefore wider coverage can be achieved.

Figure 4A:
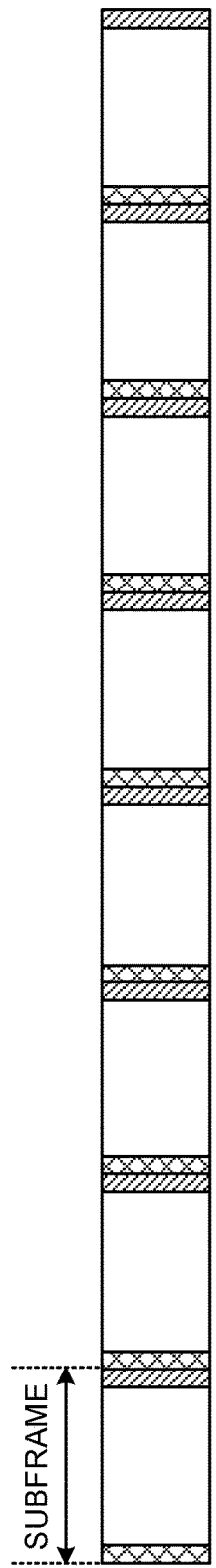
FIGS. 4A to 4C are diagrams to show examples of UL control channel structures, where the UL coverage is taken into account.
Figure 4B:
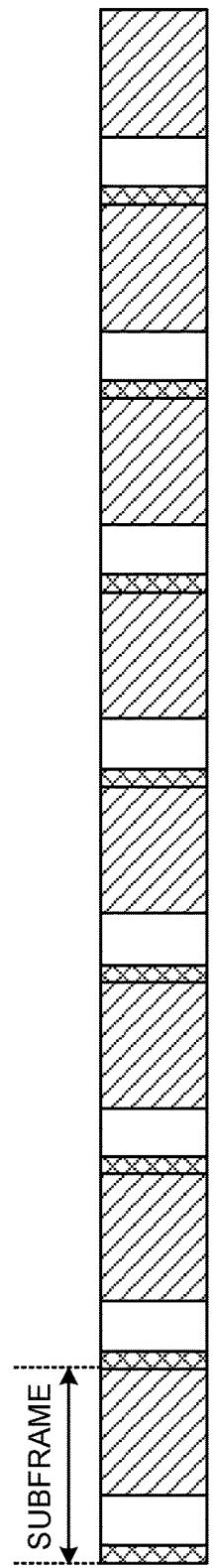

FIG. 4 provide diagrams to show examples of UL control channel structures, where the UL coverage is taken into account. In FIG. 4A, for example, a UL control channel is placed in the last symbol in each subframe. When expanding the UL coverage, as shown in FIG. 4B, a UL control channel may be placed over a number of symbols from the last symbol in each subframe.

Meanwhile, referring to FIG. 4B, when the number of symbols to place a UL control channel in each subframe is increased, it then follows that the number of symbols to place a UL data channel (or a DL data channel) in the subframe will decrease, and therefore there is a possibility that the spectral efficiency will decrease. Considering this, as shown in FIG. 4C, it may be possible to place a UL control channel in subframes in a predetermined cycle (for example, in a cycle of five subframes), instead of placing it in every subframe.

Figure 4C:
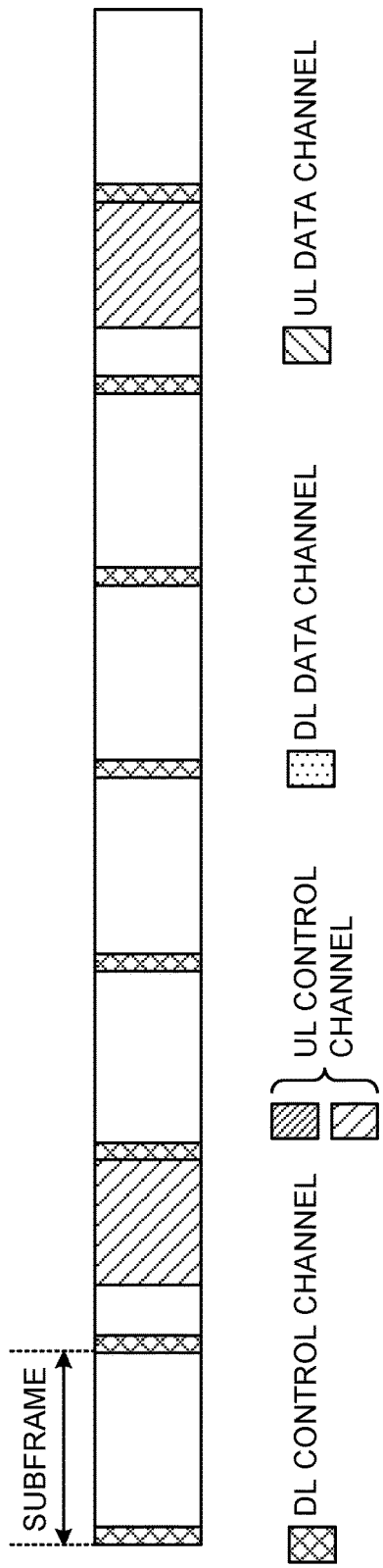

As shown in FIG. 4C, by increasing the number of symbols for placing a UL control channel in a smaller number of subframes, it is possible to prevent degradation of spectral efficiency due to the decrease of the number of symbols for placing a data channel (a UL data channel or a DL data channel). The structure shown in FIG. 4C is also suitable to feed back retransmission control information related to a plurality of subframes together (multi-TTI HARQ-ACK feedback).

In future radio communication systems, it is anticipated that there will be a number of user terminals that use services with different requirements (for example, requirements for latency reduction, coverage, throughput, and so on). Therefore, when a UL control channel of a fixed structure is applied to a number of user terminals having different requirements, the individual requirements of each of these user terminals may not be fulfilled.

FIG. 5 provide diagrams to show examples of UL control channel structures for future radio communication systems. For example, for a user terminal with strict throughput requirements (throughput-limited UE), as shown in FIG. 5A, a structure in which the number of symbols to place a UL control channel is reduced is preferable (for example, a structure to place a UL control channel in one or two symbols).

Figure 5A:
FIGS. 5A to 5C are diagrams to show examples of UL control channel structures for future radio communication systems.
Figure 5A:
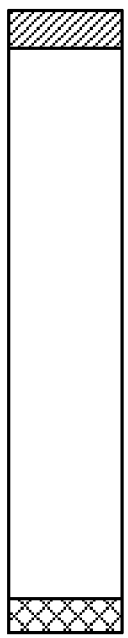
Figure 5B:
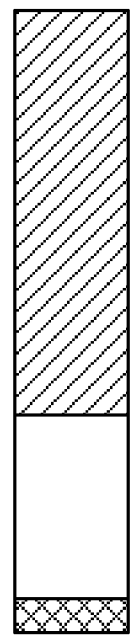

Meanwhile, for a user terminal with strict UL coverage requirements (coverage-limited UE), as shown in FIG. 5B, it is preferable to use a structure in which a UL control channel is placed in an increased number of symbols (for example, a structure to place a UL control channel in four or more symbols).

Figure 5C:
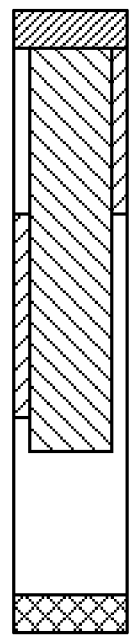

As shown in FIG. 5B, to achieve a power boosting effect when placing a UL control channel in many symbols, it is desirable to place the UL control channel in a minimal number of PRBs. In FIG. 5C, the UL control channel that is placed over multiple symbols is placed in specific PRB (for example, one PRB per symbol), and a data channel (UL data channel in FIG. 5C) is mapped to the rest of the PRBs.

Also, in FIG. 5C, frequency hopping is applied across a number of symbols where the UL control channel is placed. By this means, even one of the PRBs suffers degraded channel states, the other PRB can prevent the UL control channel's quality from deteriorating.

In this way, envisaging future radio communication systems where a number of user terminals with different requirements are present, it is desirable to be able to use UL control channels that suit the individual requirements of user terminals. So, the present inventors have come up with the idea of transmitting UCI by using UL control channels that suit the individual requirements of user terminals by supporting a number of UL control channel structures (for example, a number of structures in which the numbers of symbols varies).

Now, the present embodiment will be described below in detail. Note that, although subframes (also referred to as "TTIs" and so forth) formed with fourteen symbols will be described as examples below, the configurations of subframes (for example, the length of subframes, the number of symbols, and so forth) according to the present embodiment are by no means limited thereto.

Also, although example cases will be described below with the present embodiment where a single numerology is used within the same carrier (cell, CC, and/or the like), it is equally possible to use a number of different numerologies within the same carrier. Here, "numerology" refers to communication parameters that are found in the frequency direction and/or the time direction (for example, at least one of the spacing between subcarriers, the bandwidth, the duration of symbols, the duration of CPs, the duration of TTIs, the number of symbols per TTI, the radio frame structure, the filtering process, the windowing process and so forth).

(Overview of UL Control Channel Structure)

According to the present embodiment, a user terminal transmits uplink control information (UCI) and controls the transmission of this UCI by using an uplink (UL) control channel. The UCI may contain at least one of retransmission control information in response to a DL data channel (also referred to as "HARQ-ACK," "ACK/NACK," and so forth), channel state information (CSI), and a scheduling request (SR).

To be more specific, the user terminal selects the UL control channel structure to use to transmit UCI from among a number of UL control channel structures with different numbers of symbols. A UL control channel's structure defines what configurations are required in at least one of the generation process, the transmission process and the receiving process of the UL control channel, and may refer to, for example, the number of symbols where the UL control channel is placed, the locations of symbols, the number of frequency resource units (for example, PRBs), signal generation processing methods such as the modulation scheme and the spreading scheme applied to the UL control channel, the method of multiplexing a number of user terminals, and so forth. A UL control channel structure may be referred to as a "format," a "UL control channel format," a "PUCCH format," and so on.

The present embodiment defines multiple UL control channel structures that can be used to transmit UCI. These UL control channel structures include at least two UL control channel structures, each containing a different number of symbols. Note that these UL control channel structures may include at least two UL control channel structures with the same number of symbols.

For example, these UL channel structures may include a first UL control channel structure, which is formed with a predetermined number of symbols from the end of a subframe and a second UL control channel structure, which is formed with a larger number of symbols than the first UL control channel structure. In addition, these UL control channel structures may include a third UL control channel structure, which is formed with a larger number of symbols than the first UL control channel structure.

Note that the last symbol in a subframe is the last symbol in the time field that is available to user terminals for use, and does not necessarily have to be the last symbol of the subframe in time. For example, when a sounding reference signal (SRS) is placed (when a shortened format is used), the last symbol in a subframe needs not be the last symbol in time (for example, it may be the second symbol from the end).

In addition, the number of symbols in the second UL control channel structure and the number of symbols in the third UL control channel structure may be the same or different, as long as the number of symbols is larger than the number of symbols in the first UL control channel structure. Hereinafter, the second UL control channel structure and the third UL control channel structure will be collectively referred to as "second/third UL control channel structures," unless specified otherwise.

FIG. 6 provide diagrams to show a number of examples of UL control channel structures according to the present embodiment. Although example cases will be described below with FIG. 6 where a DL control channel is placed in the first symbol of a subframe, this DL control channel may not be placed.

Figure 6A:
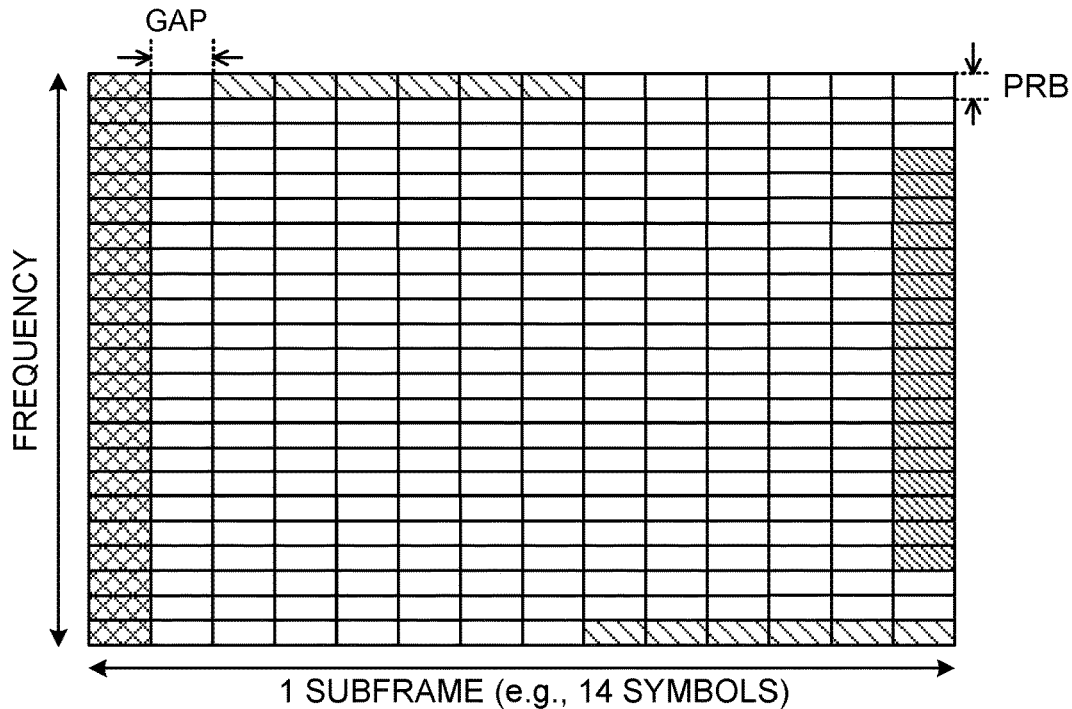
FIGS. 6A and 6B are diagrams to show a number of examples of UL control channel structures, according to the present embodiment of the present invention.

As shown in FIG. 6A, the first UL control channel structure is comprised of a predetermined number of symbols (for example, one symbol in FIG. 6A) from the end of a subframe. Also, the first UL control channel structure is comprised of one or more PRBs (for example, seventeen PRBs in FIG. 6A) in the predetermined number of symbols. Note that, although not illustrated, when the first UL control channel structure is comprised of multiple symbols, frequency hopping may be applied for every predetermined number of symbols (for example, every one symbol).

Also, as shown in FIG. 6A, the second/third UL control channel structure is comprised of a larger number of symbols than the first UL control channel (for example, four or more symbols, and twelve symbols in FIG. 6A). Also, the second/third UL control channel structure is comprised of one or more PRBs (for example, one PRB in FIG. 6A, and the number may be less than the number of PRBs in the first UL control channel structure) in the predetermined number of symbols. Also, in the second/third UL control channel structure, frequency hopping may be applied for every predetermined number of symbols (for example, every six symbols in FIG. 6A).

In FIG. 6A, in the first UL control channel structure, at least a data channel (a UL data channel or a DL data channel) and a UL control channel can be time-division-multiplexed (TDM (Time Division Multiplexing)). Also, in the second/third UL control channel structure, at least a data channel and a UL control channel can be frequency-division-multiplexed (FDM (Frequency Division Multiplexing)).

Also, in FIG. 6A, a gap period that matches an integral multiple of the symbol duration (for example, in FIG. 6A, one symbol long) is provided between the DL control channel and the UL data channel. This gap period is the time at which DL switches to UL in the user terminal. Meanwhile, in FIG. 6A, no gap period is provided (gap period is configured to 0) between the UL control channel and the time the next subframe (also referred to as a "frame," "TTI," and so forth) starts.

As to how to switch from UL to DL in time division duplex schemes (also referred to as "TDD (Time Division Duplex)," "frame structure type 2," "type 2," and so forth) of existing LTE systems, time to switch from UL to DL is provided implicitly by making longer the time configuration of timing advance (TA), which is for establishing UL synchronization, than when using frequency division duplex (also referred to as "FDD (Frequency Division Duplex)," "frame structure type 1," "type 1," and so forth). For this reason, in FIG. 6A, the gap period to provide time for switching from DL to UL is explicitly shown as in existing TDD schemes, but the gap period to provide time for switching from UL to DL is not explicitly shown.

Figure 6B:
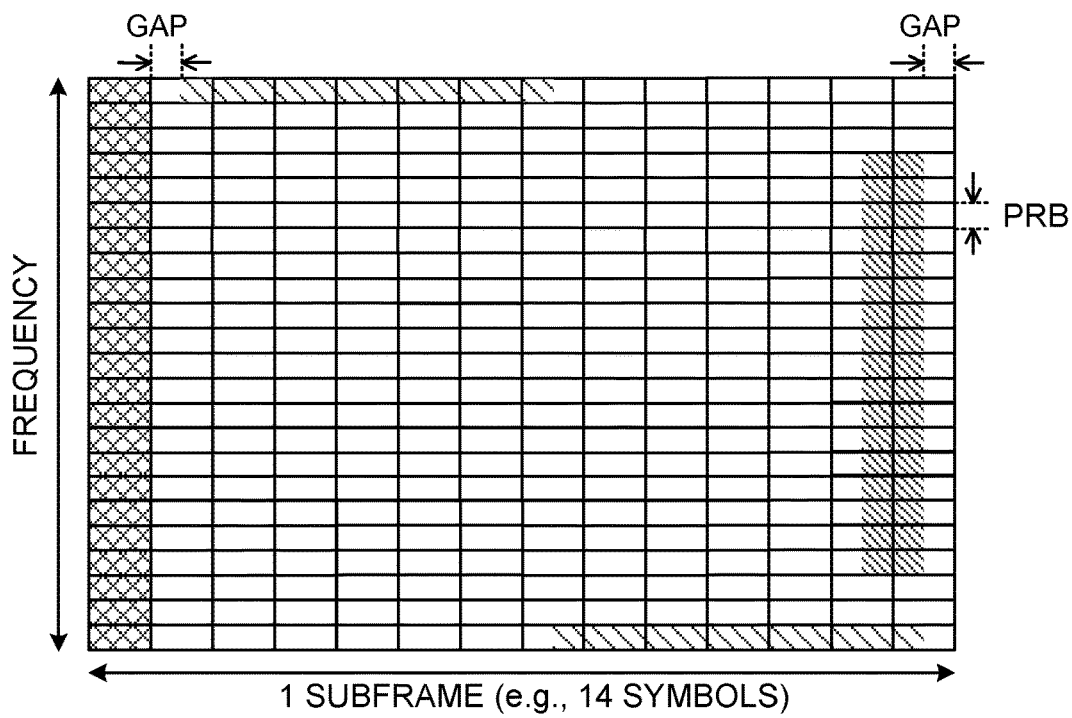

Meanwhile, for TDD schemes in future radio communication systems, research is in progress on channel structures that not only indicate the time to switch from DL to UL, but that also explicitly indicate the time to switch from UL to DL. In FIG. 6B, a gap period is provided explicitly not only between a DL control channel and a UL control channel, but also between a UL control channel and the time where the next subframe starts.

For example, in FIG. 6B, these gap periods are 0.5 symbols long. Therefore, in FIG. 6B, taking into consideration the gap period providing time for switching from UL to DL, the first UL control channel structure is designed to be as long as a predetermined number of symbols (in FIG. 6B, one symbol long), starting from the location in time the gap period backward from the end of the subframe. Likewise, the second/third UL control channel structure is designed to be as long as a predetermined number of symbols (in FIG. 6B, twelve symbols long), starting from the location in time that is the length of the gap period backward from the end of the subframe.

As shown in FIG. 6B, the time to switch from DL to UL and the time to switch from UL to DL are indicated explicitly as gap periods, so that it is not necessary to adjust the time configuration of timing advance in actual operation. Although UL control channel structures for use when the time to switch from UL to DL is not specified (as in FIG. 6A), as in the case described above with reference to FIG. 6A, will be described below, The UL control channel structures according to the present embodiment can be used as appropriate when the time to switch from UL to DL is specified (as in FIG. 6B).

Note that, in FIGS. 6A and 6B, different PRBs are allocated to the first UL control channel structure and the second/third UL control channel structure, but overlapping PRBs may be allocated. In this case, in these overlapping PRBs, only the UL control channel of the first UL control channel structure may be mapped, and the second/third UL control channel may not be mapped.

Alternatively, in these overlapping PRBs, the UL control channels of the second/third UL control channel structure may be mapped, and the UL control channel of the first UL control channel structure may not be mapped.

As described above, the present embodiment supports multiple UL control channel structures (for example, at least two or more UL control channel structures with different numbers of symbols). Consequently, for example, the first UL control channel structure to have the smaller number of symbols may be selected for user terminals with strict latency-reduction requirements, and the second/third UL control channel structure having the larger number of symbols than the first UL control channel structure may be selected for user terminal with strict throughput requirements.

(Details of UL Control Channel Structures)

Next, the first to third UL control channel structures according to the present embodiment will be described in detail. Note that the drawings described below show no explicit gap periods to provide time to switch from UL to DL. However, the first to third UL control channel structures according to the present embodiment can be used appropriately when gap periods to provide time to switch from DL to UL and time to switch from UL to DL are explicitly shown (see FIG. 6B).

<First UL Control Channel Structure>

A resource field to serve as a candidate resource field for placing the UL control channel of the first UL control channel structure (the first UL control channel field) is provided in a predetermined number of symbols from the end of a subframe, over a predetermined number of PRBs.

Figure 7A:
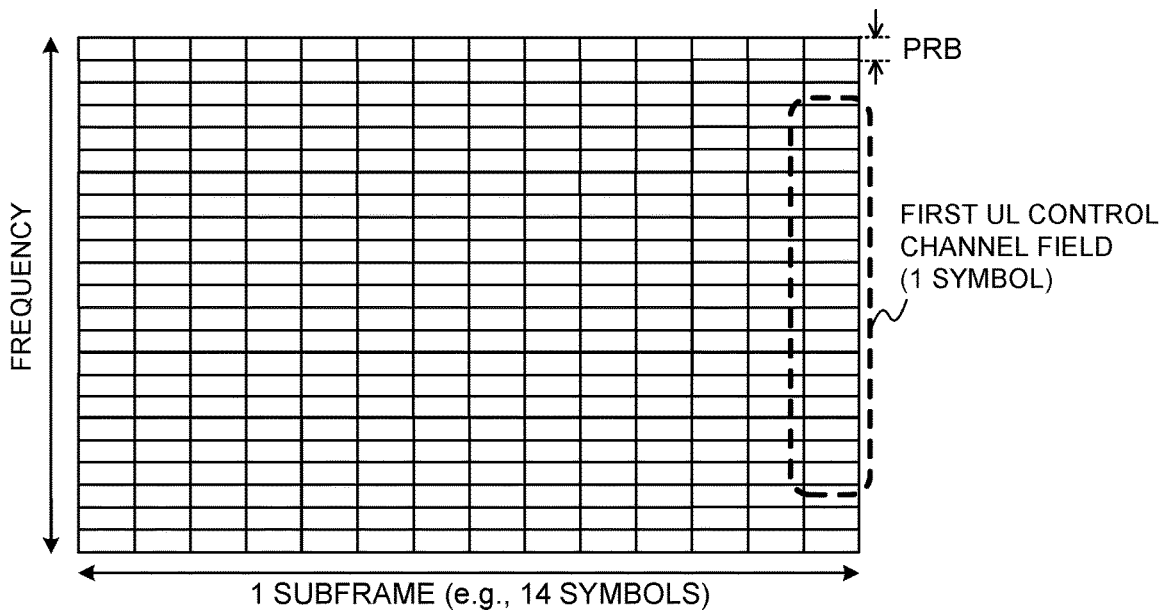
FIGS. 7A and 7B are diagrams to show examples of first UL control channel fields, according to the present embodiment.
Figure 7B:
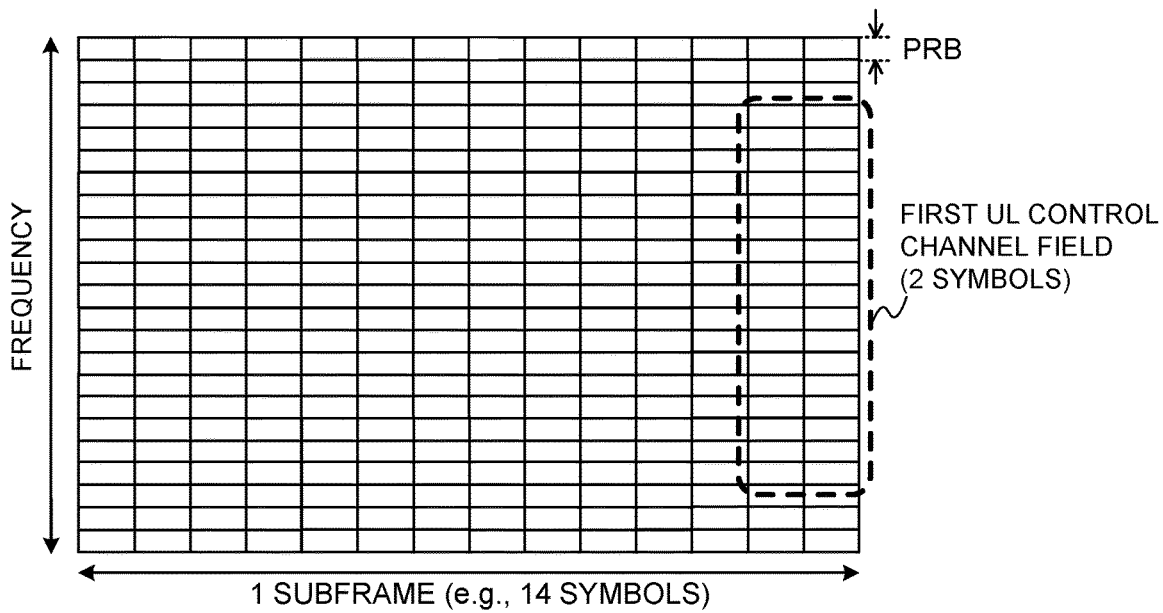

FIG. 7 provide diagrams to show examples of first UL control channel fields according to the present embodiment. The first UL control channel field may be formed with the last one symbol of a subframe as shown in FIG. 7A, or may be formed with the last two symbols of a subframe as shown in FIG. 7B. Note that FIGS. 7A and 7B are simply examples and by no means limiting. The first UL control channel field may be formed with the last three or more symbols in a subframe.

Also, as shown in FIGS. 7A and 7B, the first UL control channel field is configured in at least part of the frequency band (for example, the system band, the field where a data channel is allocated, and so on) that is available to a user terminal for use.

In FIGS. 7A and 7B, the first UL control channel field may be configured semi-statically by higher layer signaling (for example, RRC (Radio Resource Control) signaling, MAC (Medium Access Control) signaling and so forth) or broadcast information (for example, the MIB (Master Information Block) and/or SIBs (System Information Blocks)), may be configured on a dynamic basis by physical layer signaling (for example, a DL control channel), or may be configured by using at least one combination of these.

To be more specific, the user terminal receives information related to the first UL control channel field (first UL control channel field information) through at least one of higher layer signaling, broadcast information, and physical layer signaling.

The first UL control channel field information may be, for example, at least one of the location of symbols constituting the first UL control channel field, the number of symbols, the PRBs allocated, and the number of PRBs allocated—that is, information to indicate the first UL control channel field in an explicit manner. Alternatively, the first UL control channel field information may be information to indicate the first UL control channel field in an implicit manner, such as at least one of cell identification information (cell ID) and user terminal identification information (UE-ID), and the user terminal may determine the first UL control channel field by itself.

Also, the first UL control channel fields shown in FIGS. 7A and 7B may serve as resource fields for common use by a number of user terminals communicating in the same carrier (cell, component carrier (CC) and so forth), or serve as user terminal-specific resource fields.

The following description will assume that the first UL control channel field is shared by a number of user terminals, as mentioned earlier. In this first UL control channel field, the UCI of each of these user terminals is multiplexed by at least one of frequency division multiplexing (FDM), time division multiplexing (TDM), and code division multiplexing (CDM). That is, each user terminal's UCI is transmitted using at least one of the time resource, the frequency resource, the code resource and the frequency hopping pattern of the first UL control channel field.

Figure 8A:
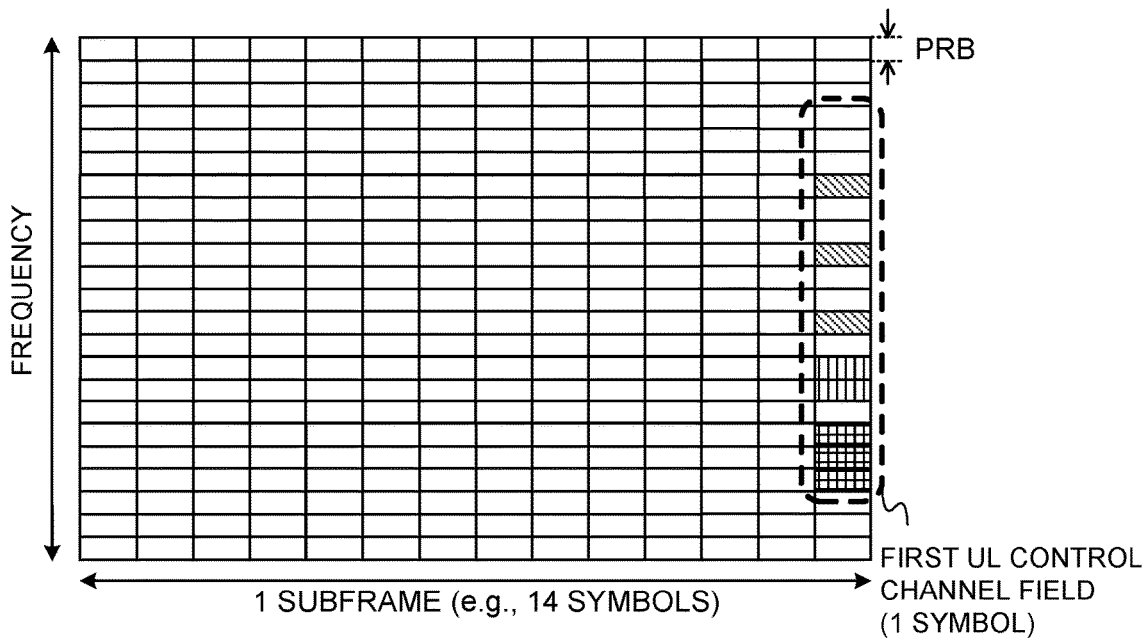
FIGS. 8A and 8B are diagrams to show examples of multiplexing UCIs in first UL control channel fields, according to the present embodiment.
Figure 8B:
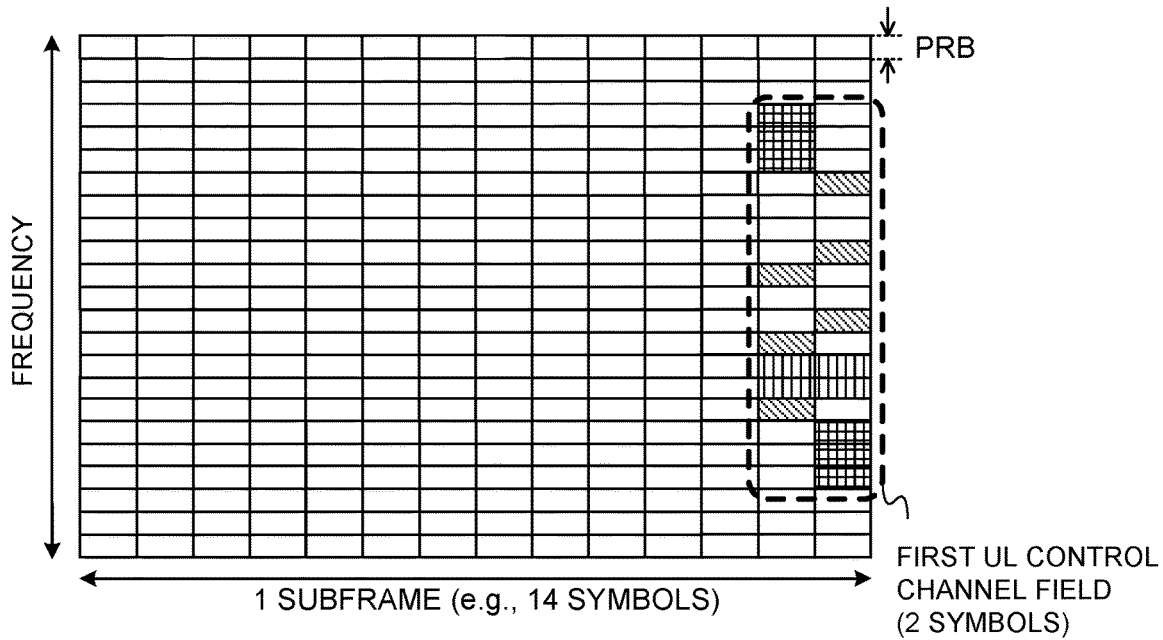

FIG. 8 provide diagrams to show examples of multiplexing UCI in the first UL control channel field according to the present embodiment. The first UL control channel fields shown in FIGS. 8A and 8B are used in common by user terminals (UEs) 1 to 4. Furthermore, in FIGS. 8A and 8B, the time resource of the first UL control channel field is a symbol, the frequency resource is a symbol, the code resource is an orthogonal spreading code (for example, OCC (Orthogonal Cover Code)), but this is by no means limiting.

In the case illustrated in FIG. 8A, the first UL control channel field is formed with the last one symbol in the subframe. For example, in FIG. 8A, three PRBs, which are different from those of the other user terminals, are allocated to the UCI of user terminal 1. Likewise, two PRBs that are different from those of the other user terminals are allocated to the UCI of user terminal 2. Meanwhile, to the UCI of user terminal 3, two PRBs that overlap those of user terminal 4 are allocated, and an orthogonal spreading code that is different from that of user terminal 4 is assigned.

In this manner, at least one of the time resource, the frequency resource and the code resource of the first UL control channel field is allocated to each user terminal as a resource for transmitting UCI. This transmission resource may be specified explicitly through higher layer signaling and/or physical layer signaling.

For example, in the case of FIG. 8A, information to specify a resource for transmitting UCI (for example, a PRB index, an orthogonal code index and so on) may be included in DCI (which is, for example, a DL assignment that allocates a DL data channel or a UL grant that allocates a UL data channel). Alternatively, this transmission resource may be determined implicitly by the user terminal based on information (for example, UE-ID, subframe number, and so forth) sent in higher layer signaling and/or physical layer signaling.

In the case illustrated in FIG. 8B, the first UL control channel field is formed with the last two symbols in the subframe. In FIG. 8B, as in FIG. 8A described above, resources for transmitting UCI are allocated to each user terminal in the first UL control channel field.

As shown in FIG. 8B, when the first UL control channel field is formed with a number of symbols, frequency hopping may be applied between symbols. For example, in FIG. 8B, frequency hopping is applied on a per symbol basis. The pattern of this frequency hopping may be user terminal-specific (that is, may be determined based on user terminal-specific information), or may be used by a number of user terminals in common (that is, may be determined based on information that applies to a number of user terminals in common (for example, cell identification information (cell ID), subframe number, and so forth)).

As described above, the CP-OFDM scheme may be used to transmit UCI in the first UL control channel field. According to the CP-OFDM scheme, UCI may be modulated and spread in the frequency domain, and reference signals (for example, the demodulation reference signal (DM-RS) for UCI) may be frequency-division-multiplexed with UCI by a given frequency resource unit (for example, by one or more subcarrier).

In the CP-OFDM scheme, the user terminal may encode the bit sequence of UCI (hereinafter also referred to as "UCI bits"), modulate the encoded bit sequence (digital modulation), and map the modulated symbol (hereinafter also referred to as "UCI symbol") onto orthogonal subcarriers.

Note that the user terminal may attach CRC (Cyclic Redundancy Check) bits that are scrambled by using the UE-ID and/or the cell ID, to the end of the UCI bit sequence, and then encode this UCI bit sequence.

Also, the user terminal may apply rate matching to the UCI bits based on how many subcarriers the UCI symbol is mapped to. Also, the user terminal may spread and/or repeat the UCI symbol based on how many subcarriers the UCI symbol is mapped to.

Also, the user terminal may modulate (digital modulation) a reference signal and map the modulated symbols onto orthogonal subcarriers. Note that the sequence and/or arrangement pattern of this reference signal may be specified explicitly by information sent in higher layer signaling and/or physical layer signaling (for example, at least one of subcarrier number, symbol number, and arrangement pattern index), or may be determined implicitly based on information sent in higher layer signaling and/or physical layer signaling (for example, the UE-ID and/or the cell ID).

Figure 9:
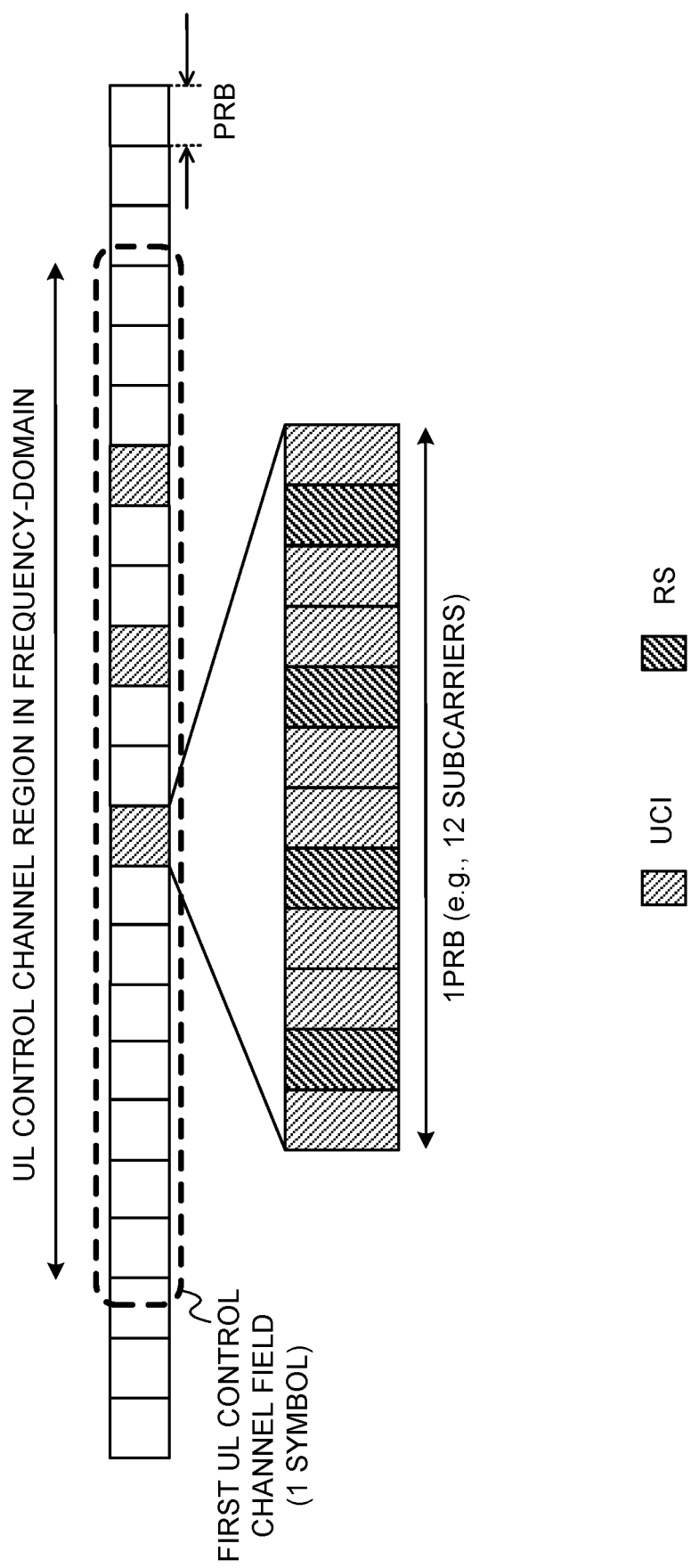
FIG. 9 is a diagram to show an example of multiplexing reference signals in the first UL control channel field, according to the present embodiment.

FIG. 9 is a diagram to show an example of multiplexing reference signals in the first UL control channel field according to the present embodiment. Note that, in FIG. 9, each PRB is constituted by twelve subcarriers, but this is only an example and is by no means limiting.

As shown in FIG. 9, in each PRB allocated to the user terminal in the first UL control channel field, reference signals and UCI symbols may be frequency-division-multiplexed on a subcarrier-by-subcarrier basis. Note that the number of reference signals and the locations where these signals are placed shown in FIG. 9 are simply examples and not limiting.

<Second UL Control Channel Structure>

A resource field (second UL control channel field) to be a candidate for placing the UL control channel of the second UL control channel structure is formed with a larger number of symbols than the first UL control channel field (which is, for example, formed with four or more symbols). Note that the second UL control channel field may be formed with all the symbols in a subframe, or may be formed with part of the symbols.

Also, the second UL control channel field may be formed with a predetermined number of PRBs constituting the fields at both ends of the frequency band that is available to user terminals for use (for example, the system band (also referred to as the "cell (CC) bandwidth" and so on), a field where a data channel is allocated, and so forth). In this way, by forming the second UL control channel field with a number of resource fields that are apart in the frequency direction, frequency hopping can be applied to the UL control channel.

Figure 10A:
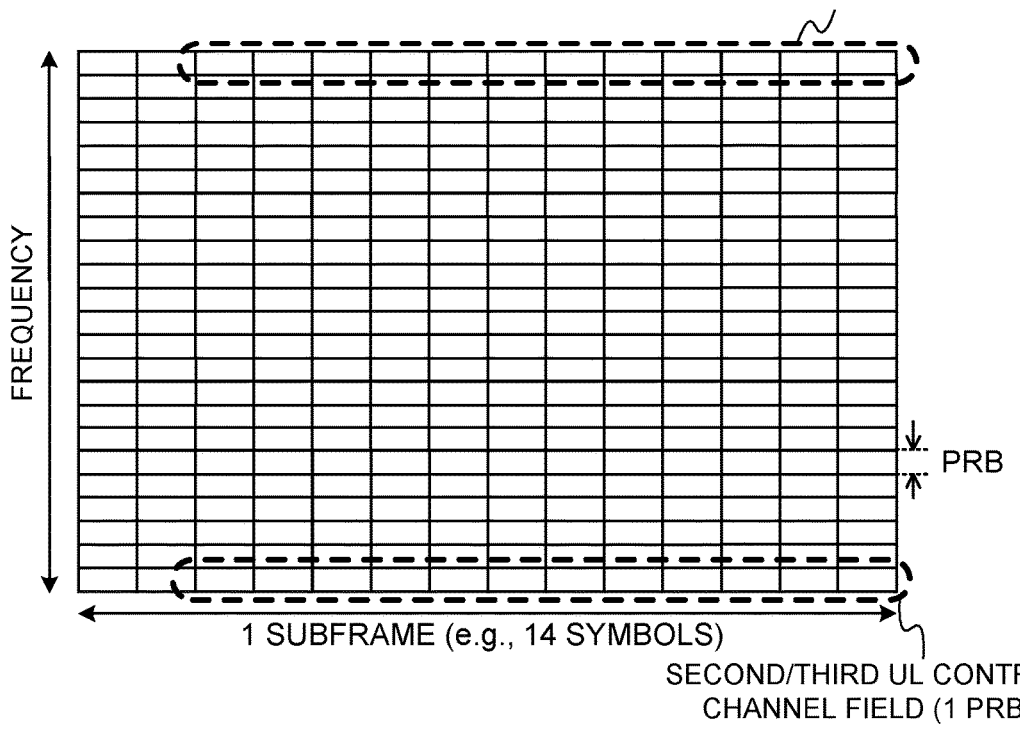
FIGS. 10A and 10B are diagrams to show examples of second UL control channel fields, according to the present embodiment.
Figure 10B:
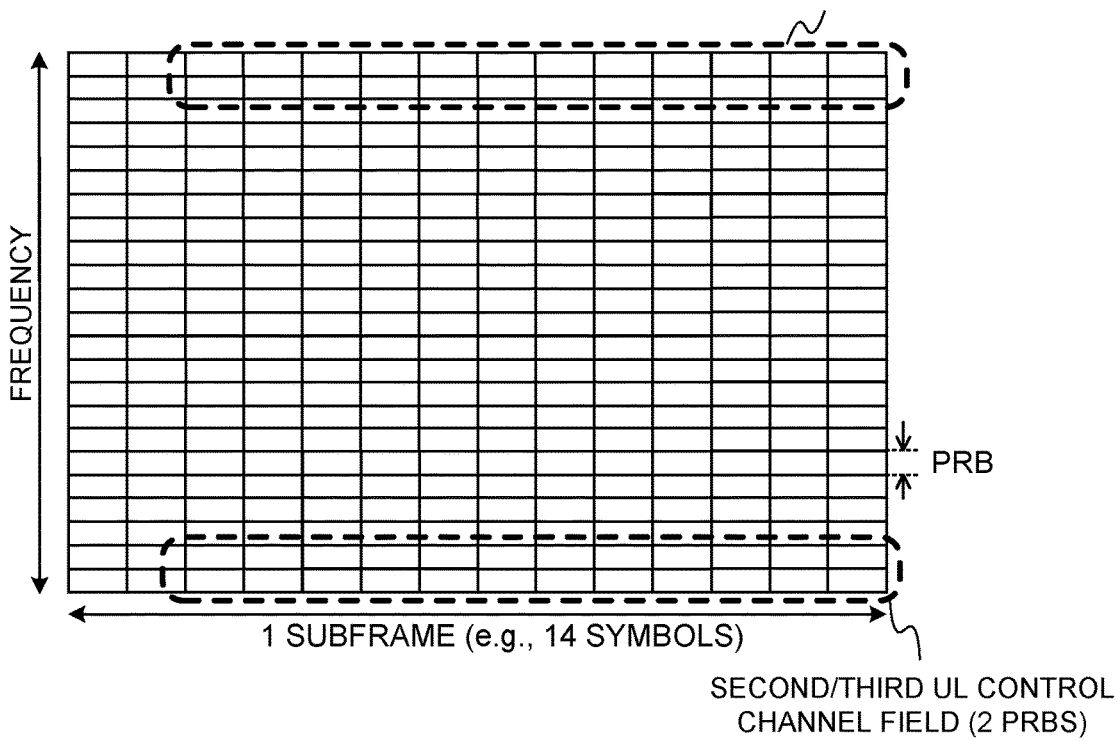

FIG. 10 provide diagrams to show examples of second UL control channel fields according to the present embodiment. A second UL control channel field may be formed with one PRB in the field at either end of the frequency band that is available to user terminals for use, as shown in FIG. 10A, or may be formed with two PRBs in the field at either end of the frequency band as shown in FIG. 10B. Note that, FIGS. 10A and 10B only show examples, and these are by no means limiting. A second UL control channel field may be formed with three or more PRBs in the field at either end of the frequency band.

Also, as shown in FIGS. 10A and 10B, the second UL control channel fields may be comprised of a greater number of symbols (here, twelve symbols), starting from the last symbol in the subframe, than the first UL control channel field. Note that, although not illustrated, the second UL control channel field may be formed with all the symbols in the subframe.

In FIGS. 10A and 10B, the second UL control channel field may be configured semi-statically by higher layer signaling (for example, RRC signaling, MAC signaling and so forth) or broadcast information (for example, the MIB and/or SIBs), may be configured dynamically by physical layer signaling (for example, a DL control channel), or may be configured by using at least one combination of these.

To be more specific, the user terminal receives information related to the second UL control channel field (second UL control channel field information) through at least one of higher layer signaling, broadcast information, and physical layer signaling.

The second UL control channel field information may be, for example, at least one of the location of symbols constituting the second UL control channel field, the number of symbols, the PRBs allocated, and the number of PRBs allocated—that is, information to indicate the second UL control channel field in an explicit manner. Alternatively, the second UL control channel field information may be information to indicate the second UL control channel field in an implicit manner, such as at least one of the cell ID, the UE-ID and so on, and the user terminal may determine the second UL control channel field by itself.

Also, the second UL control channel fields shown in FIGS. 10A and 10B may serve as resource fields for common use by a number of user terminals communicating in the same carrier (cell, component carrier (CC)), or serve as user terminal-specific resource fields.

The following description will assume that the second UL control channel field is shared by a number of user terminals, as mentioned earlier. In this second UL control channel field, the UCI of each of these user terminals is multiplexed by at least one of frequency division multiplexing (FDM), time division multiplexing (TDM), and code division multiplexing (CDM). That is, each user terminal's UCI is transmitted using at least one of the time resource, the frequency resource and the code resource of the second UL control channel field.

Figure 11A:
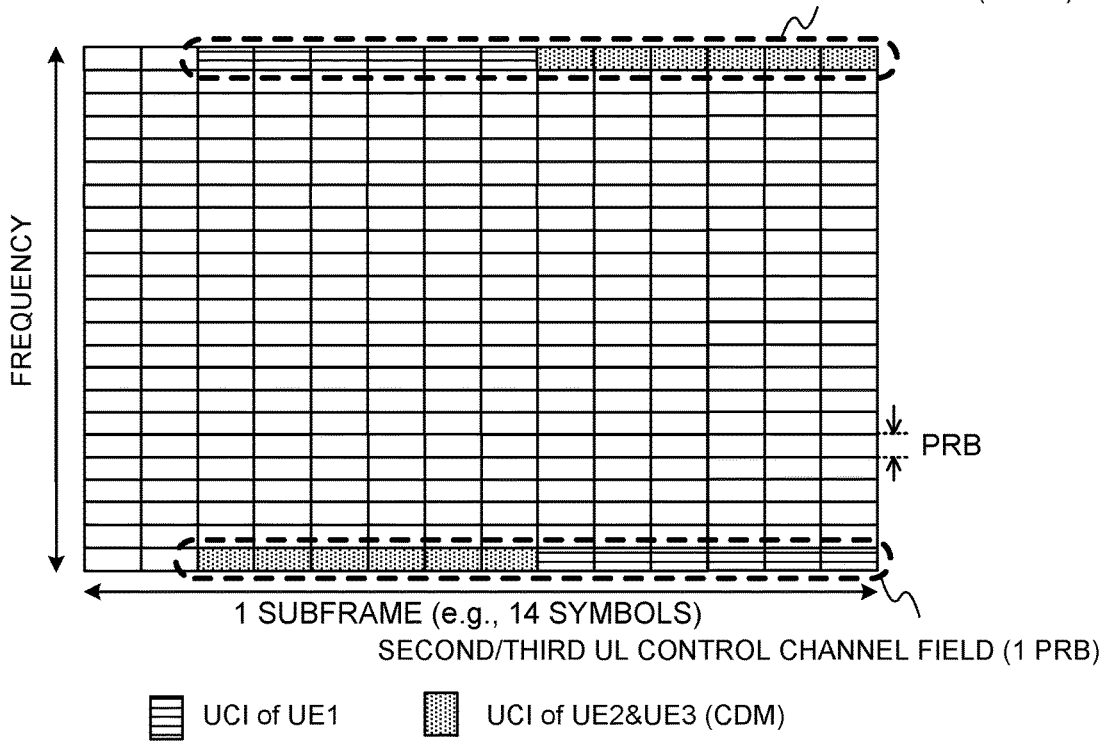
FIGS. 11A and 11B are diagrams to show examples of multiplexing UCIs in second UL control channel fields, according to the present embodiment.
Figure 11B:
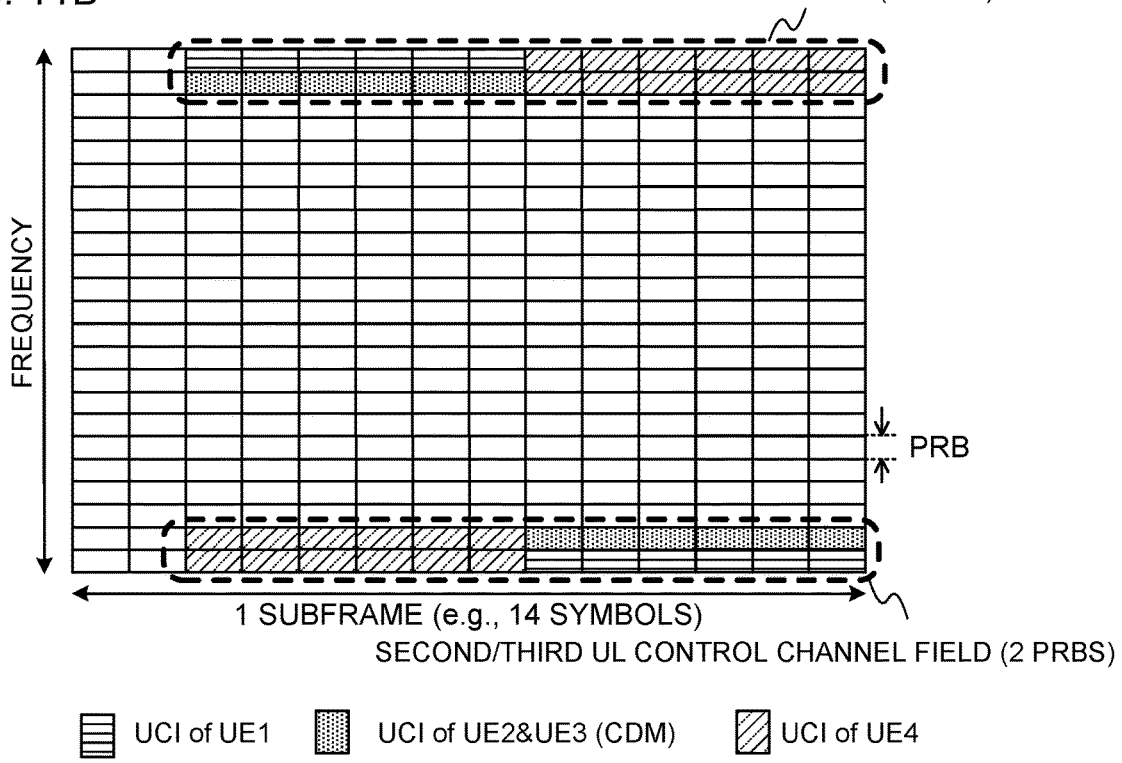

FIG. 11 provide diagrams to show examples of multiplexing UCI in second UL control channel fields according to the present embodiment. The second UL control channel fields shown in FIGS. 11A and 11B are used in common by user terminals (UEs) 1 to 4. Furthermore, in FIGS. 11A and 11B, the time resource of the first UL control channel field is a symbol, the frequency resource is a symbol, the code resource is an orthogonal code (for example, OCC), but this is by no means limiting.

In FIG. 11A, a second UL control channel field is formed with one PRB at either end of the frequency band which is available for use by user terminals 1 to 4. For example, in FIG. 11A, one PRB is allocated to the UCI of user terminal 1, in the same way as with other user terminals, and a frequency hopping pattern that is different from that of other user terminals is applied. As for user terminals 2 and 3, the same one PRB and the same frequency hopping pattern are applied, but the orthogonal code to be assigned varies.

In this manner, at least one of the time resource, the frequency resource, the code resource and the frequency hopping pattern of the second UL control channel field is allocated to each user terminal as a resource for transmitting UCI. This transmission resource may be specified explicitly by information that is sent through higher layer signaling and/or physical layer signaling.

For example, in FIG. 11A, information specifying resources for transmitting UCIs (for example, PRB index, index of orthogonal code, index of frequency hopping pattern, and so forth) may be included in the DCI (for example, DL assignment or UL grant). Alternatively, this transmission resource may be determined implicitly by the user terminal based on information (for example, UE-ID, subframe number, and so forth) sent in higher layer signaling and/or physical layer signaling.

FIG. 11B shows a case where the second UL control channel fields are each formed with two PRBs at either end of the frequency band that is available to user terminals 1 to 4 for use. In FIG. 11B, as in FIG. 11A described above, resources for transmitting UCI are allocated to each user terminal in the second UL control channel field.

As shown in FIG. 11B, when the second UL control channel field is formed with a number of PRBs, the UCIs of different user terminals may be multiplexed per PRB, or the UCI of the same user terminal (for example, user terminal 4 in FIG. 11B) may be multiplexed over these PRBs.

In FIGS. 11A and 11B, frequency hopping is applied for every predetermined number of symbols (here, every six symbols) constituting the second UL control channel field. The pattern of this frequency hopping may be user terminal-specific (that is, may be determined based on user terminal-specific information), or may be used in common by a number of user terminals (that is, may be determined based on information that applies to a number of user terminals in common (for example, the cell ID, the subframe number, and so forth)).

As described above, the DFT-S-OFDM scheme may be used to transmit UCI in the second UL control channel field. According to the DFT-S-OFDM scheme, UCI may be modulated and spread in the frequency domain, and reference signals (for example, the demodulation reference signal (DM-RS) for UCI) may be time-division-multiplexed with UCI per predetermined time resource unit (for example, per symbol).

In the DFT-S-OFDM scheme, the user terminal may encode and spread the UCI bits, modulate (digital modulation) the bit sequence that has been encoded and spread, and spread each block (grouping by block).

Note that the user terminal may attach CRC (Cyclic Redundancy Check) bits that are scrambled by using the UE-ID and/or the cell ID, to the end of the UCI bit sequence, and then encode this UCI bit sequence.

Also, the user terminal may apply rate matching to the UCI bits based on how many subcarriers it takes to transmit the UCI. Also, the user terminal may spread and/or repeat the modulated symbol of UCI (UCI symbol) based on how many subcarriers it takes to transmit the UCI.

Also, the user terminal may generate reference signals based on a predetermined scheme (for example, based on a CAZAC (Constant Amplitude Zero Auto-Correlation) sequence, the OFDM scheme and so on), and time-multiplex the reference signals generated, with UCI symbols. Note that the arrangement pattern of these reference signals may be specified explicitly by information that is sent in higher layer signaling and/or physical layer signaling (for example, at least one of subcarrier number, symbol number, and arrangement pattern index), or may be determined implicitly based on information that is sent in higher layer signaling and/or physical layer signaling (for example, the UE-ID and/or the cell ID).

Figure 12A:
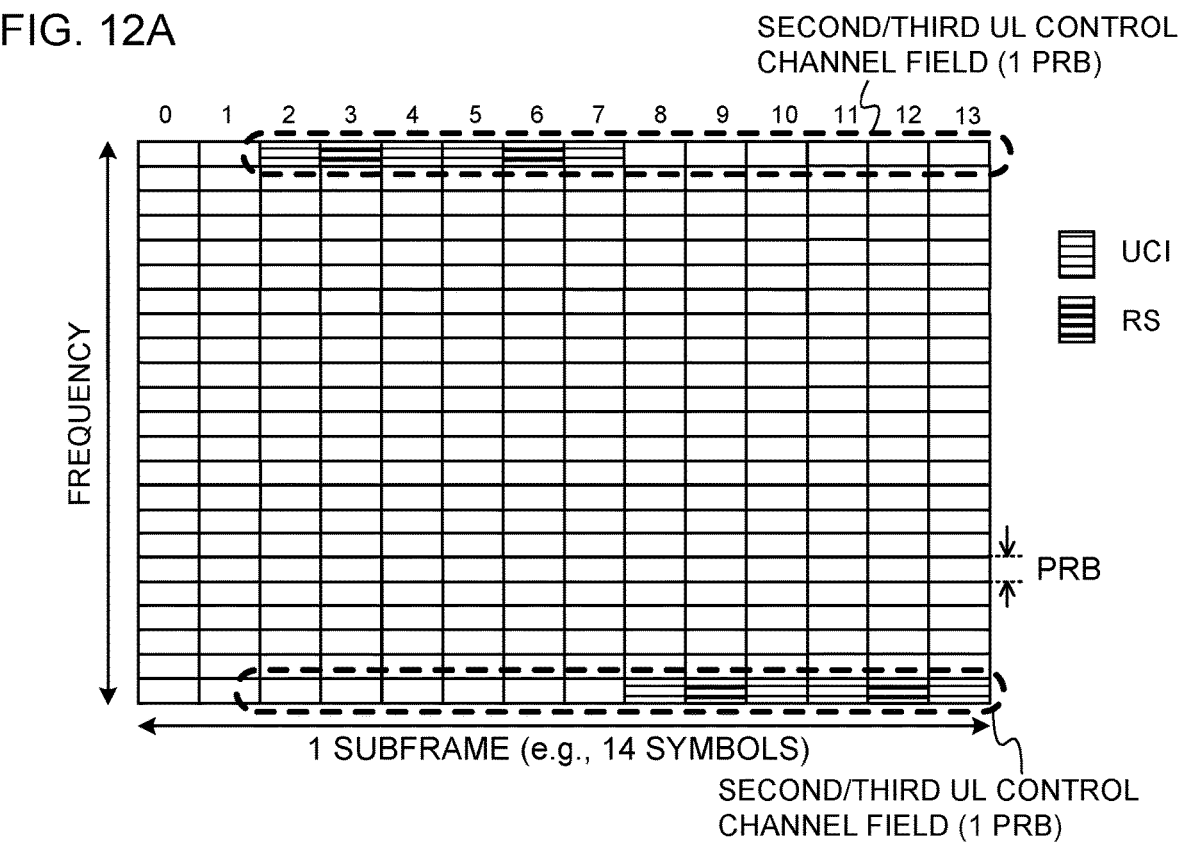
FIGS. 12A and 12B are diagrams to show examples of multiplexing reference signals in second UL control channel fields, according to the present embodiment.
Figure 12B:
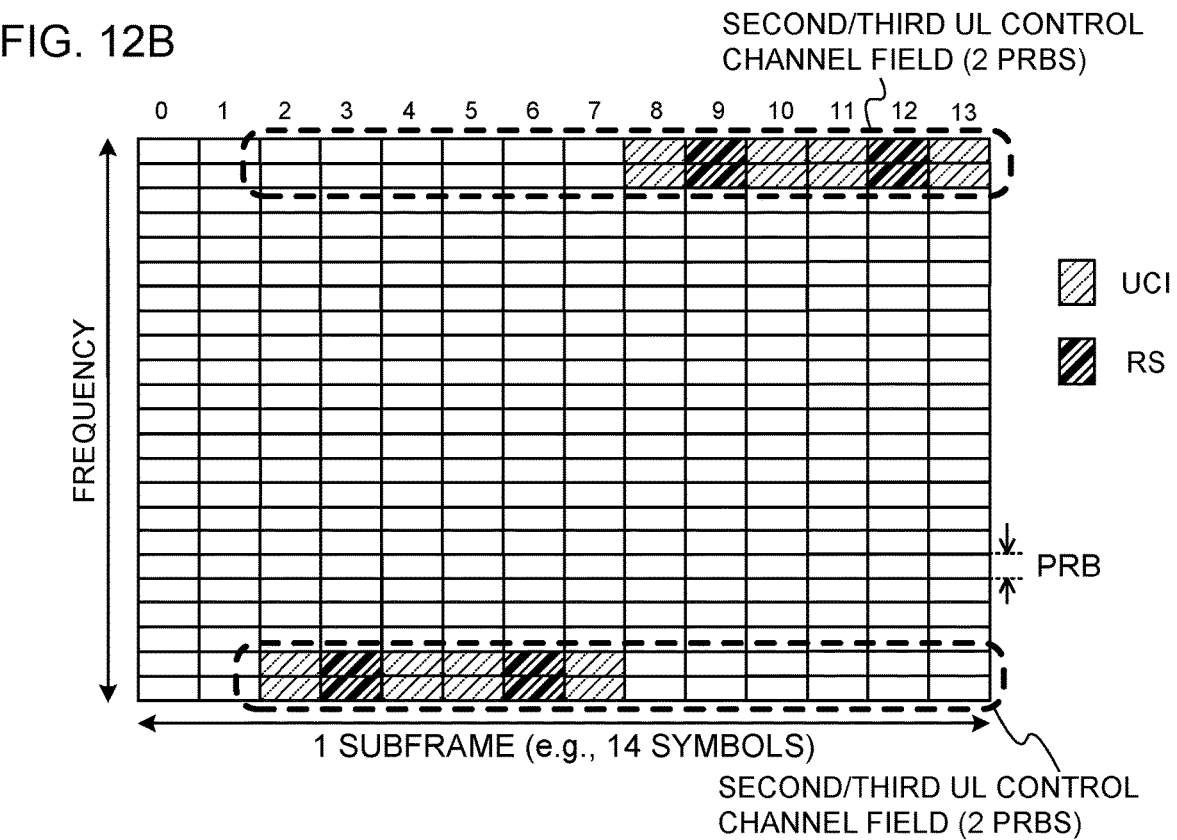

FIG. 12 provide diagrams to show examples of multiplexing reference signals in the second UL control channel field according to the present embodiment. As shown in FIGS. 12A and 12B, in each PRB allocated to the user terminal in the second UL control channel field, reference signals and UCI may be frequency-division-multiplexed on a symbol-by-symbol basis.

When generating the second UL control channel based on the DFT-S-OFDM scheme, UCI symbols are mapped to all subcarriers of the PRBs allocated to the UCI. In addition, in FIGS. 12A and 12B, unlike in the CP-OFDM scheme (see FIG. 9), reference signals and UCI are not frequency-division-multiplexed on by the subcarriers. Note that the number of reference signals and the locations where these signals are placed, as shown in FIGS. 12A and 12B, are simply examples and are by no means limiting.

<Third UL Control Channel Structure>

A resource field (third UL control channel field) to be a candidate for placing the UL control channel of the third UL control channel structure is formed with a larger number of symbols than the first UL control channel field (which is, for example, formed with four or more symbols). Note that the second UL control channel field may be formed with all the symbols in a subframe, or may be formed with part of the symbols. Also, the number of symbols in the third UL control channel field may be the same as or different from that in the second UL control channel field.

The third UL control channel field is configured like the second UL control channel field (for example, as shown in FIGS. 10A and 10B). The third UL control channel field may be configured semi-statically by higher layer signaling (for example, RRC signaling, MAC signaling) or broadcast information (for example, the MIB and/or SIBs), may be configured dynamically by physical layer signaling (for example, DL control channel), or may be configured by using at least one combination of these. Also, the third UL control channel field may be used by a number of user terminals in common, or may be specific to each of these user terminals.

In the third UL control channel field, as in the second UL control channel field (for example, as shown in FIGS. 11A and 11B), at least one of the time resource, the frequency resource, the code resource, and the frequency hopping pattern of the third UL control channel field is allocated to each user terminal as a resource for transmitting UCI. This transmission resource may be specified explicitly by information sent in higher layer signaling and/or physical layer signaling. Alternatively, this transmission resource may be determined implicitly by the user terminals based on information sent in higher layer signaling and/or physical layer signaling.

Note that, if the second and third UL control channel fields are configured in the same subframe, the second and third UL control channel fields are constituted by different PRBs.

In the third UL control channel field described above, a CAZAC sequence may be used to transmit UCI, instead of the DFT-S-OFDM scheme used in the second UL control channel field. To be more specific, a user terminal may encode the UCI bits, modulate the encoded bits based on a predetermined modulation scheme (for example, BPSK or QPSK), and code-spread and transmit the modulated UCI symbol in the frequency direction by using a CAZAC sequence.

Here, the CAZAC sequence is dependent on the number of PRBs (the number of subcarriers) constituting each symbol, and the sequence length of the CAZAC sequence is equal to the number of subcarriers in the PRBs allocated to the UCI (for example, twelve in FIG. 12A).

Also, the user terminal may code-spread and transmit the UCI symbol in the time direction by using an orthogonal spreading code (for example, Walsh code). The code length of this orthogonal spreading code may be equal to the number of symbols where no reference signal is mapped among the symbols constituting the third UL control channel field. For example, when, in the third UL control channel field, frequency hopping is applied every six symbols and reference signals are mapped to two symbols in the same PRB (see FIGS. 12A and 12B), the sequence length of the orthogonal spreading code may be 4.

Also, a user terminal may generate reference signals based on a predetermined scheme (for example, by using a CAZAC sequence or OFDM scheme), and time-multiplex the generated reference signals with UCI symbols (for example, see FIG. 12). Note that the arrangement pattern of these reference signals may be specified explicitly by information that is sent in higher layer signaling and/or physical layer signaling (for example, at least one of subcarrier number, symbol number, and arrangement pattern index), or may be determined implicitly based on information that is sent in higher layer signaling and/or physical layer signaling (for example, the UE-ID and/or the cell ID).

(Control of Selection of UL Control Channel Structure)

Next, control of selection of UL control channel structures in user terminals will be described below. A user terminal selects the UL control channel structure to use to transmit UCI from a number of UL control channel structures (for example, the first to third UL control channel structures).

To be more specific, a user terminal selects a UL control channel structure based on specifying information from a radio base station. For example, the user terminal may select the UL control channel structure used for transmitting the UCI from a number of UL control channel structures (for example, the first UL control channel structure and the second/third UL control channel structure) containing different numbers of symbols, based on this specifying information.

Also, the user terminal may change the UCI to transmit depending on which UL control channel structure is used for transmission. For example, when UCI is transmitted in the first UL control channel structure in an n-th subframe, the user terminal transmits UCI that contains retransmission control information (ACK/NACK) in response to the DL data channel allocated to the (n–x)-th subframe (where x is 0 or greater), and, when UCI is transmitted in the second/third UL control channel structure in an n-th subframe, the user terminal transmits UCI not containing retransmission control information (ACK/NACK) in response to the DL data channel allocated to the (n–x)-th subframe (where x is 0 or greater). When UCI is transmitted in the second/third UL control channel structure in an n-th subframe, the user terminal can transmit UCI that contains retransmission control information (ACK/NACK) in response to the DL data channel allocated to the (n–x–y)-th subframe (where x is 0 or greater and y is 1 or greater).

The specifying information may be one-bit information to indicate whether or not to use the first UL control channel structure, or may be information that specifies the UL control channel structure to use to transmit UCI (for example, the (index) number of a UL control channel structure). This configuration information may be transmitted using at least one of higher layer signaling, broadcast information, and physical layer signaling. For example, when specifying information is transmitted in higher layer signaling and/or broadcast information, it is possible to select, semi-statically, between multiple UL control channel structures with different numbers of symbols.

Note that in the event no specific UL control channel structure is configured (or one is yet to be configured), such as during initial access procedures, the user terminal may select the second/third UL control channel structure, which contains more symbols than the first UL control channel structure does. As a result, UL coverage in initial access procedures, for example, can be reserved.

Alternatively, if no particular UL control channel is configured (or one is yet to be configured), such as during initial access procedures, the user terminal may select the first UL control channel structure, which contains a smaller number of symbols than the second/third UL control channel structure does. By this means, for example, the UL overhead in initial access procedures can be minimized.

Also, the user terminal can select the UL control channel structure to use to transmit UCI from a number of UL control channel structures (including, for example, a second UL control channel structure, a third UL control channel structure and so forth) containing more symbols than the first UL control channel structure does. To be more specific, the user terminal may select between these UL control channel structures based on the number of UCI bits (payload).

For example, the user terminal may select the second UL control channel structure when the number of UCI bits is equal to or larger than a predetermined value (for example, three bits), or decides to use the third UL control channel structure when the number of UCI bits is less than a predetermined value.

Alternatively, depending on which UL control channel structure is used for transmission, the user terminal may drop the UCI, in a selective manner, based on the type, priority and so on, so that the UCI to be transmitted stays within a predetermined payload.

For example, in the event the number of UCI bits is equal to or more than a predetermined value (for example, twenty two bits) and UCI transmission in the second UL control channel structure is commanded, the user terminal may drop UCI that corresponds to kinds, types or indices of low priority, so that the number of UCI bits stays within a predetermined value (for example, twenty two bits), and transmit the UCI within a predetermined value (for example, twenty two bits), selected in this way, in the second UL control channel structure as commanded.

Furthermore, when transmitting UCI (for example, HARQ-ACK) by using the first and/or the second UL control channel structure, the user terminal may include UCI-identifying information in the UCI. This identification information may include at least one of identification information that identifies the user terminal transmitting the UCI (for example, HARQ-ACK), information that indicates in response to which subframe's and which cell's DL data channel this UCI returns HARQ-ACK (for example, the subframe number, the cell (CC) index, and so forth). By this means, even in asynchronous HARQ, retransmission control can be appropriately executed based on this UCI.

Furthermore, when transmitting UCI (for example, HARQ-ACK) using the third UL control channel structure, the user terminal may transmit, as UCI, HARQ-ACK in response to the DL data channel of a predetermined unique timing (for example, the subframe that is four subframes back, the nearest subframe before four or more subframes, and so forth). In this way, retransmission control can be carried out adequately based on synchronous HARQ.

As described above, the present embodiment supports multiple UL control channel structures (for example, a number of UL control channel structures containing different numbers of symbols). Consequently, for example, the first UL control channel structure, containing relatively a small number of symbols, may be selected for user terminals with strict latency-reduction requirements, and the second/third UL control channel structure having a larger number of symbols than the first UL control channel structure may be selected for user terminal with strict throughput requirements. Therefore, the user terminal can transmit uplink control information (UCI) by using UL control channel that suit the requirements.

(Reference Signal Structures Based on Second/Third UL Control Channel Structure)

Now, other examples of reference signal structures based on the second/third UL control channel structure will be described. With the above present embodiment, the second/third UL control channel structure has been described on assumption that a DL control channel is placed in a predetermined number of symbols at the tops of a subframe.

By contrast with this, subframes in which no DL control channel is placed and in which UL data channels and/or UL control channels are placed may be used. When no DL control channel is placed in a subframe, the second/third UL control channel field may be comprised of all the symbols in the subframe.

In the event the second/third UL control channel structure is constituted by all the symbols in a subframe, the arrangement of reference signals may be the same as that of the second/third UL control channel structure (FIG. 13), or may not be the same (FIG. 14). In this manner, the arrangement of reference signals in the second/third UL control channel structure may be the same (fixed) regardless of how many symbols are used in the second/third UL control channel structure, or may be changed depending on the number of symbols.

Figure 13A:
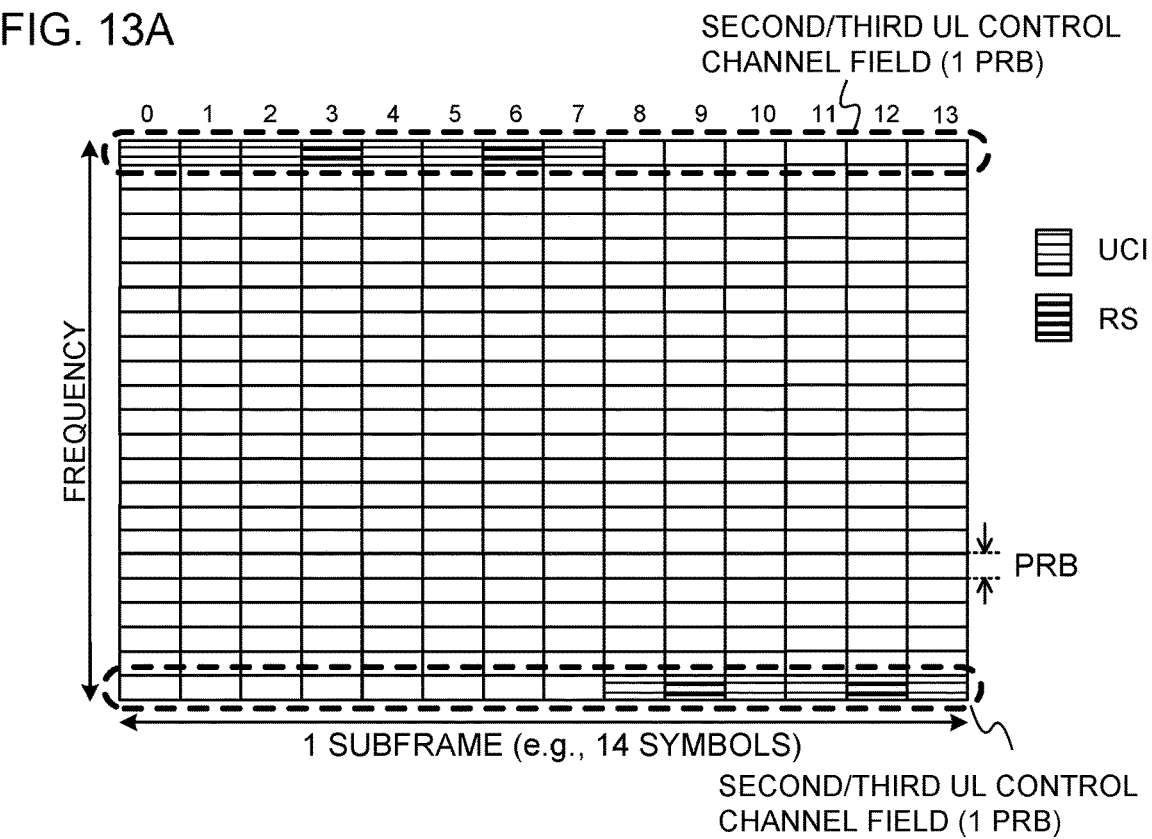
FIGS. 13A and 13B are diagrams to show other example of multiplexing reference signals in second/third UL control channel fields, according to the present embodiment.
Figure 13B:
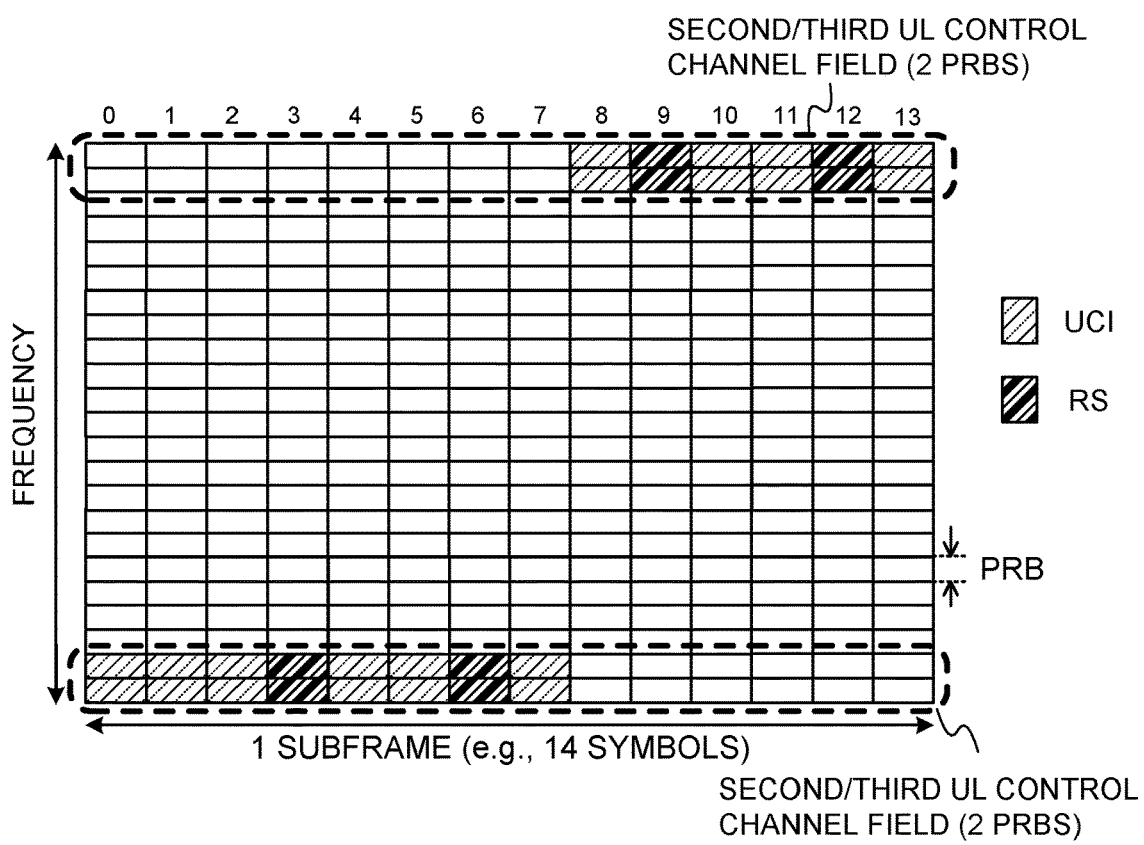

FIG. 13 provide diagrams to show examples of using the same arrangement of reference signals according to the present embodiment. In FIGS. 13A and 13B, the second/third UL control channel fields are constituted by all the symbols in a subframe. Referring to the second/third UL control channel fields shown in FIGS. 13A and 13B, reference signals are placed on the same symbols as those of the second/third UL control channel fields shown in FIGS. 12A and 12B. That is, reference signals are placed on the same symbols regardless of the number of symbols constituting the second/third UL control channel fields.

As shown in FIGS. 13A and 13B, by fixing the number and/or the locations of symbols to place reference signals regardless of the number of symbols constituting the second/third UL control channel fields, interference between cells can be readily randomized.

Figure 14A:
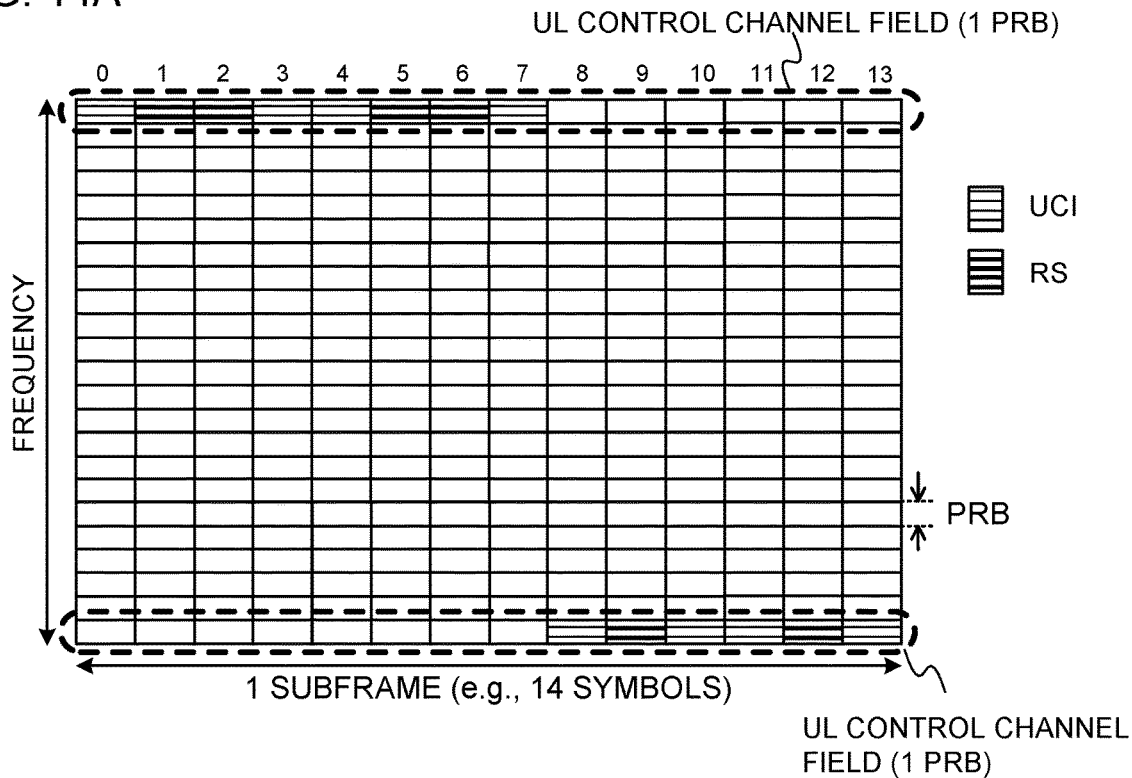
FIGS. 14A and 14B are diagrams to show other examples of multiplexing reference signals in second/third UL control channel fields, according to the present embodiment.
Figure 14B:
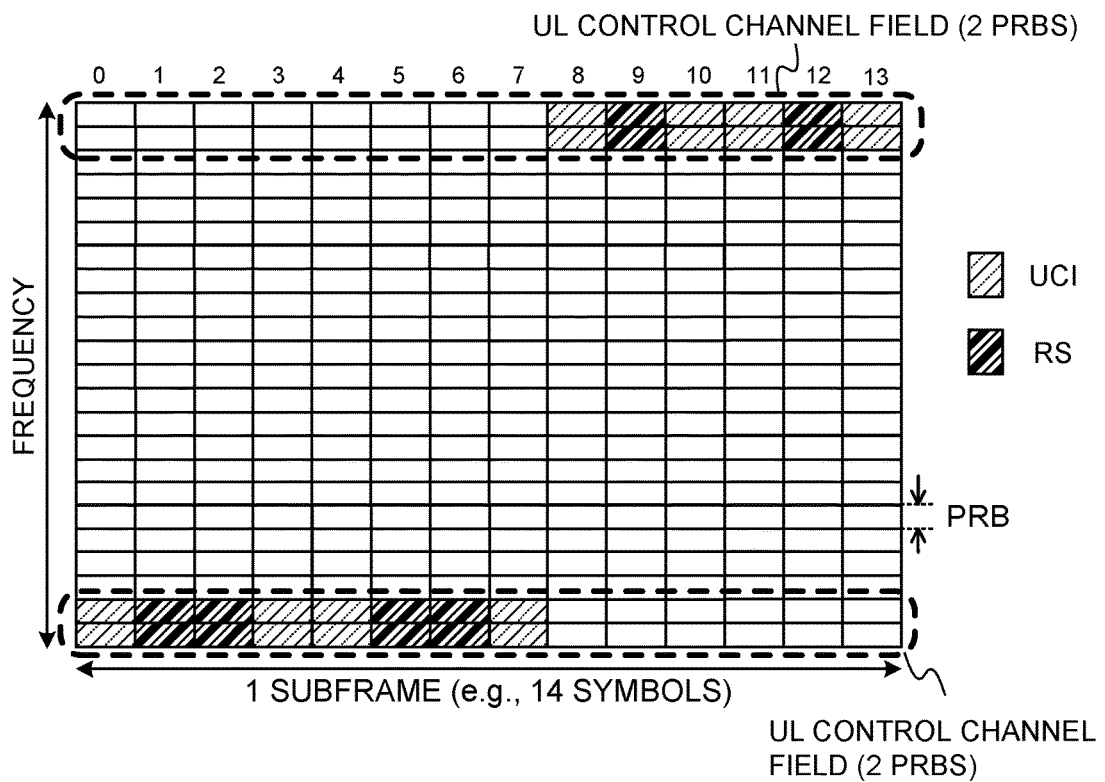

FIG. 14 provide diagrams to show examples of different arrangements of reference signals, according to the present embodiment. In FIGS. 14A and 14B, the second/third UL control channel fields are constituted by all the symbols in a subframe. Referring to the second/third UL control channel fields shown in FIGS. 14A and 14B, reference signals are placed on symbols, at least one of which is different than the second/third UL control channel fields shown in FIGS. 12A and 12B.

For example, in FIGS. 12A and 12B, reference signals are placed on symbols 3, 6, 9 and 12. On the other hand, in FIGS. 14A and 14B, reference signals are placed on symbols 1, 2, 5, 6, 9 and 12. Thus, the symbols where reference signals are placed in FIGS. 14A and 14B partially overlap with the symbols where reference signals are placed in FIGS. 12A and 12B, the reference signals of FIGS. 14A and 14B are placed on non-overlapping symbols as well.

In this way, the number of symbols in which reference signals are placed may be changed depending on the number of symbols constituting the second/third UL control channel field. As shown in FIGS. 14A and 14B, the number and/or locations of symbols in which reference signals are placed are controlled adaptively depending on the number of symbols constituting the second/third UL control channel field, so that the accuracy of channel estimation using reference signals can be improved.

(Radio Communication System)

Now, the structure of a radio communication system according to the present embodiment will be described below. In this radio communication system, each radio communication method according to the above-described embodiments is employed. The radio communication methods according to individual embodiments may be applied alone or may be applied in combination.

Figure 15:
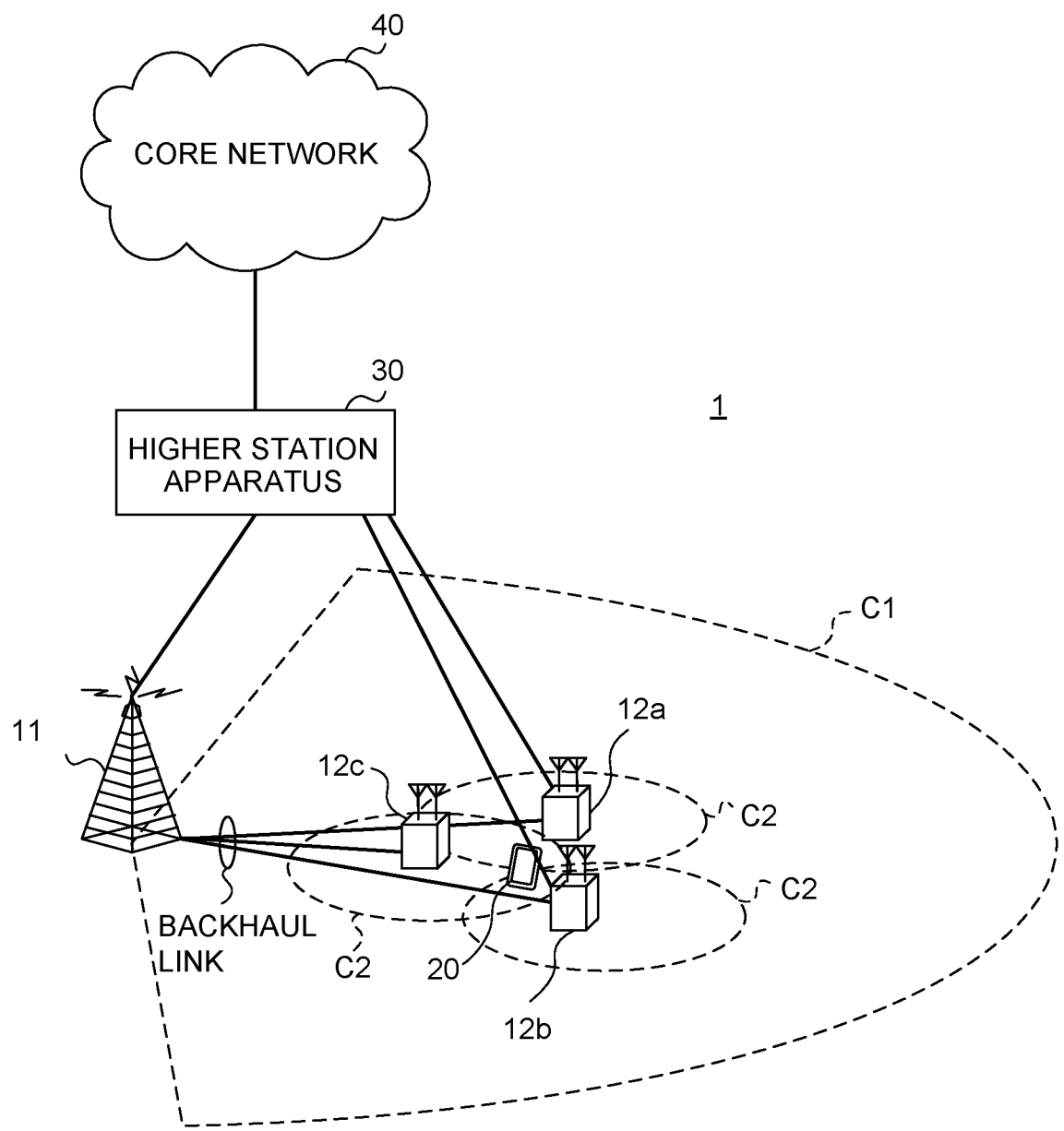
FIG. 15 is a diagram to show an example of a schematic structure of a radio communication system according to the present embodiment.

FIG. 15 is a diagram to show an example of a schematic structure of a radio communication system according to the present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit. Note that the radio communication system 1 may be also referred to as "SUPER 3G," "LTE-A (LTE-Advanced)," "IMT-Advanced," "4G," "5G," "FRA (Future Radio Access)," "NR (New RAT (New Radio Access Technology))," and so on.

The radio communication system 1 includes a radio base station 11 that forms a macro cell C1, and radio base stations 12a to 12c that are placed within the macro cell C1 and that form small cells C2, which are narrower than the macro cell C1. Also, user terminals 20 are placed in the macro cell C1 and in each small cell C2. A structure in which different numerologies are applied between cells and/or within cells may be adopted.

The user terminals 20 can connect with both the radio base station 11 and the radio base stations 12. The user terminals 20 may use the macro cell C1 and the small cells C2 at the same time by means of CA or DC. Also, the user terminals 20 can execute CA or DC by using a number of cells (CCs) (for example, two or more CCs). Furthermore, the user terminals 20 can use licensed-band CCs and unlicensed-band CCs as a number of cells.

Furthermore, the user terminal 20 can communicate by using time division duplexing (TDD) or frequency division duplexing (FDD) in each cell. A TDD cell and an FDD cell may be referred to as a "TDD carrier (frame structure type 2)," and an "FDD carrier (frame structure type 1)," respectively.

Furthermore, in each cell (carrier), a single numerology may be employed, or a number of different numerologies may be employed.

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on.

Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals. Furthermore, the user terminals 20 can perform device-to-device (D2D) communication with other user terminals 20.

In the radio communication system 1, as radio access schemes, OFDMA (orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combination of these, and OFDMA may be used in UL.

In the radio communication system 1, a downlink shared channel (PDSCH (Physical Downlink Shared CHannel)), which is shared by each user terminal 20, a broadcast channel (PBCH (Physical Broadcast CHannel)), L1/L2 control channels and so on are used as downlink channels. User data, higher layer control information and SIBs (System Information Blocks) are communicated in the PDSCH. Also, the MIB (Master Information Block) is communicated in the PBCH.

The L1/L2 control channels include a DL control channel (a PDCCH (Physical Downlink Control CHannel), an EPDCCH (Enhanced Physical Downlink Control CHannel)), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. The EPDCCH is frequency-division-multiplexed with the PDSCH and used to communicate DCI and so on, like the PDCCH. HARQ retransmission command information (ACK/NACK) in response to the PUSCH can be communicated using at least one of the PHICH, the PDCCH and the EPDCCH.

In the radio communication system 1, a UL shared channel (PUSCH (Physical Uplink Shared CHannel)), which is shared by each user terminal 20, an uplink control channel (PUCCH (Physical Uplink Control CHannel)), a random access channel (PRACH (Physical Random Access CHannel)) and so on are used as UL channels. User data, higher layer control information and so on are communicated by the PUSCH. Uplink control information (UCI), including at least one of DL signal retransmission control information (A/N), channel state information (CSI) and so on, is communicated in the PUSCH or the PUCCH. By means of the PRACH, random access preambles for establishing connections with cells are communicated.

(Radio Base Station)

Figure 16:
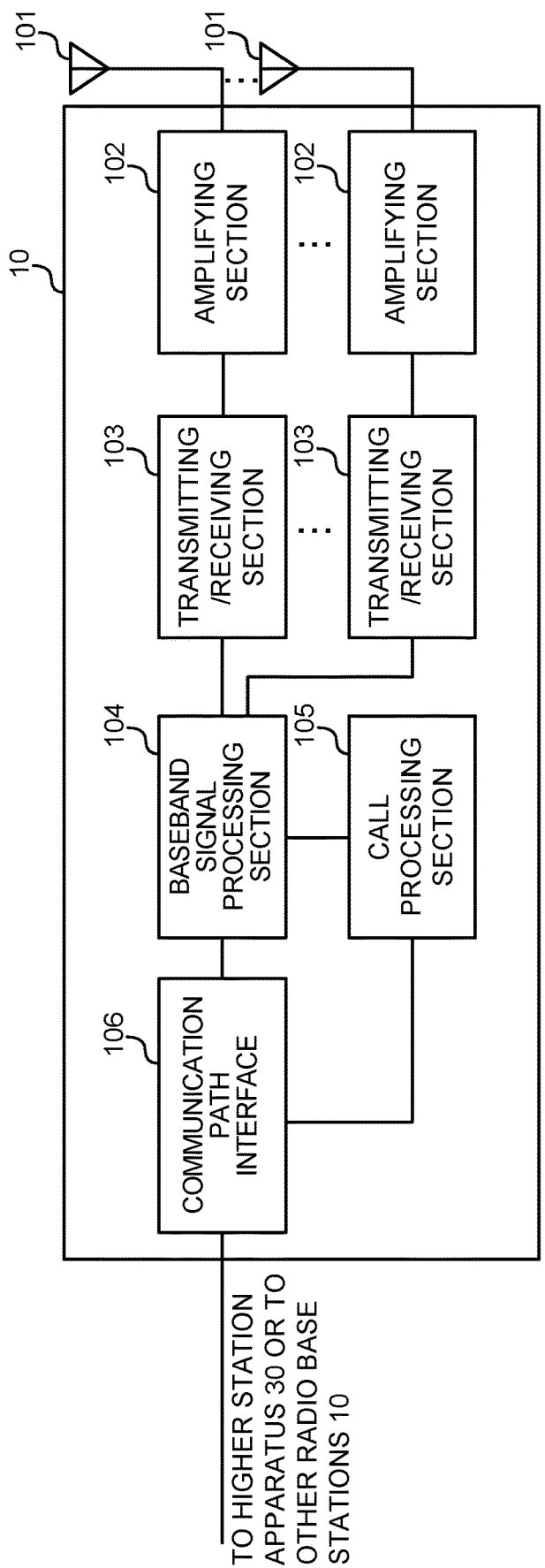
FIG. 16 is a diagram to show an example of an overall structure of a radio base station according to the present embodiment.

FIG. 16 is a diagram to show an example of an overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to the transmitting/receiving sections 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. Also, the communication path interface 106 may transmit and receive signals (backhaul signaling) with neighboring radio base stations 10 via an inter-base station interface (which is, for example, optical fiber that is in compliance with the CPRI (Common Public Radio Interface), the X2 interface, and so forth).

In addition, the transmitting/receiving sections 103 transmit DL signals (including at least one of DL data signals, DL control signals and DL reference signals) to a number of user terminals 20 that use different numerologies, and receive UL signals (including at least one of UL data signals, UL control signals and UL reference signals) from these user terminals 20.

In addition, the transmitting/receiving sections 103 receive UCI from the user terminals 20 through a UL data channel (for example, PUSCH) or a UL control channel (for example, PUCCH). This UCI contains at least one of HARQ-ACK in response to the DL data channel (for example, PDSCH), CSI, and SR.

Also, the transmitting/receiving sections 103 may transmit information related to resource fields (for example, first to third UL control channel field information) that serve as candidates for placing UL control channels of respective UL control channel structures, and/or specifying information for use when selecting UL control channel structures.

Figure 17:
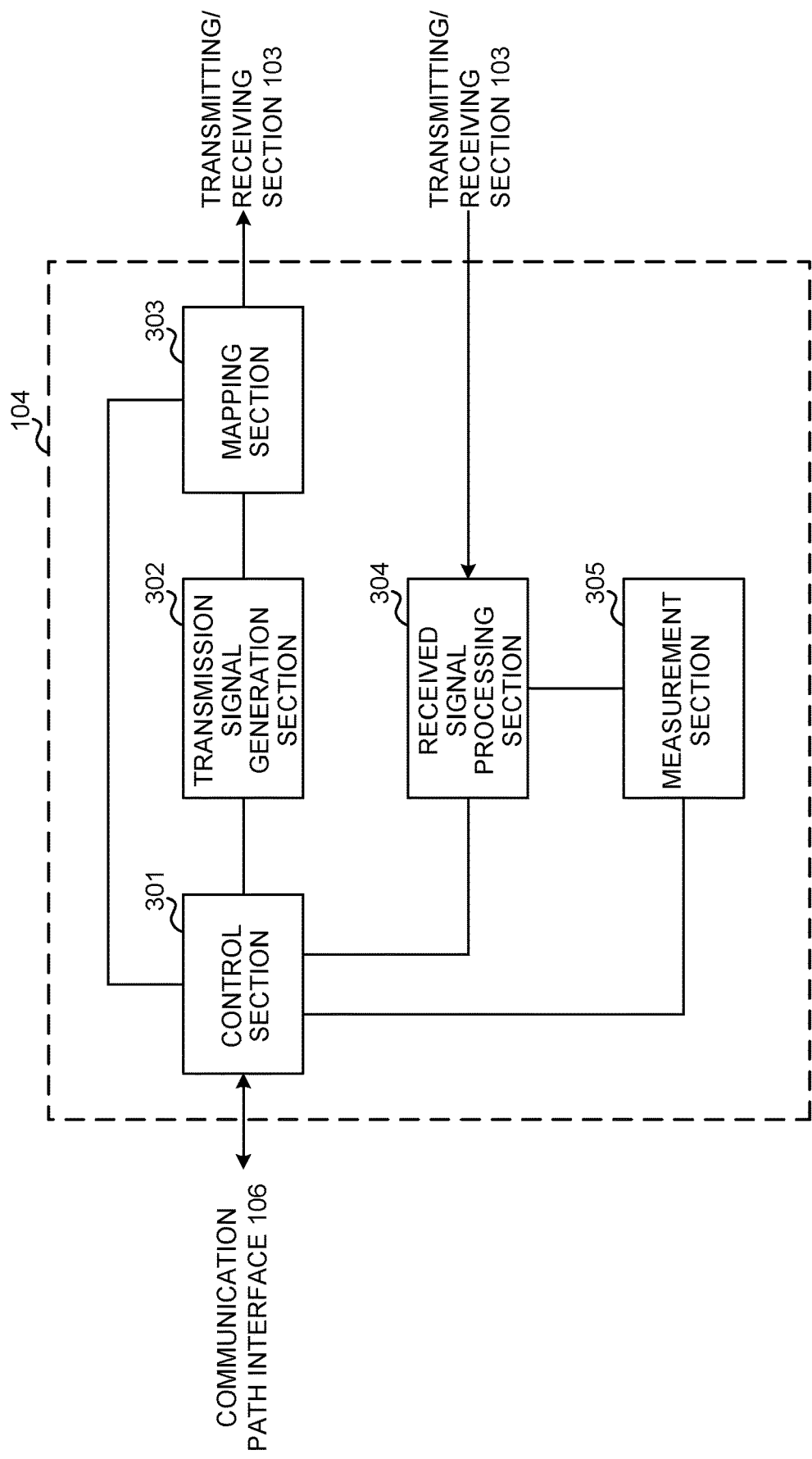
FIG. 17 is a diagram to show an example of a functional structure of a radio base station according to the present embodiment.

FIG. 17 is a diagram to show an example of a functional structure of a radio base station according to the present embodiment. Note that, although this example primarily shows functional blocks that pertain to characteristic parts of the present embodiment, the radio base station 10 has other functional blocks that are necessary for radio communication as well. As shown in FIG. 17, the baseband signal processing section 104 has a control section 301, a transmission signal generation section 302, a mapping section 303, a received signal processing section 304 and a measurement section 305.

The control section 301 controls the whole of the radio base station 10. The control section 301 controls, for example, generation of DL signals in the transmission signal generation section 302, mapping of DL signals in the mapping section 303, UL signal receiving processes (including, for example, demodulation) in the received signal processing section 304 and measurements in the measurement section 305.

The control section 301 schedules user terminals 20. To be more specific, the control section 301 may perform scheduling and/or retransmission control with respect to DL data channels and/or UL data channels based on UCI from the user terminals 20.

In addition, the control section 301 may exert control so that a UL control channel structure that is used to transmit UCI from the user terminals 20 is selected from a number of UL control channel structures, and specifying information that designates the selected UL control channel structure is transmitted. These UL control channel structures include the first UL control channel structure and the second/third UL control channel structure that have been described earlier.

The control section 301 may exert control so that resource fields to serve as candidates for placing UL control channels of respective UL control channel structures (for example, the first to third UL control channel fields) are configured, and information about these resource fields (for example, first to third UL control channel field information) is transmitted.

The control section 301 may control the received signal processing section 304 to perform receiving processes for UCI from the user terminals 20 in accordance with each UL control channel structure.

The control section 301 can be constituted by a controller, a control circuit or control apparatus that can be described based on general understanding of the technical field to which the present invention pertains.

The transmission signal generation section 302 generates DL signals (including DL data signals, DL control signals, DL reference signals and so on) based on commands from the control section 301, and outputs these signals to the mapping section 303.

The transmission signal generation section 302 can be constituted by a signal generator, a signal generating circuit or signal generating apparatus that can be described based on general understanding of the technical field to which the present invention pertains.

The mapping section 303 maps the DL signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding, and so forth) for UL signals transmitted from the user terminals 20 (including, for example, UL data signals, UL control signals, UL reference signals, and so forth). To be more specific, the received signal processing section 304 may output the received signals, the signals after the receiving processes and so on, to the measurement section 305. In addition, the received signal processing section 304 performs UCI receiving processes based on which UL control channel structure is specified by the control section 301.

The measurement section 305 conducts measurements with respect to the received signal. The measurement section 305 can be constituted by a measurer, a measurement circuit or measurement apparatus that can be described based on general understanding of the technical field to which the present invention pertains.

Also, the measurement section 305 may measure the channel quality in UL based on, for example, the received power (for example, RSRP (Reference Signal Received Power)) and/or the received quality (for example, RSRQ (Reference Signal Received Quality)) of UL reference signals. The measurement results may be output to the control section 301.

(User Terminal)

Figure 18:
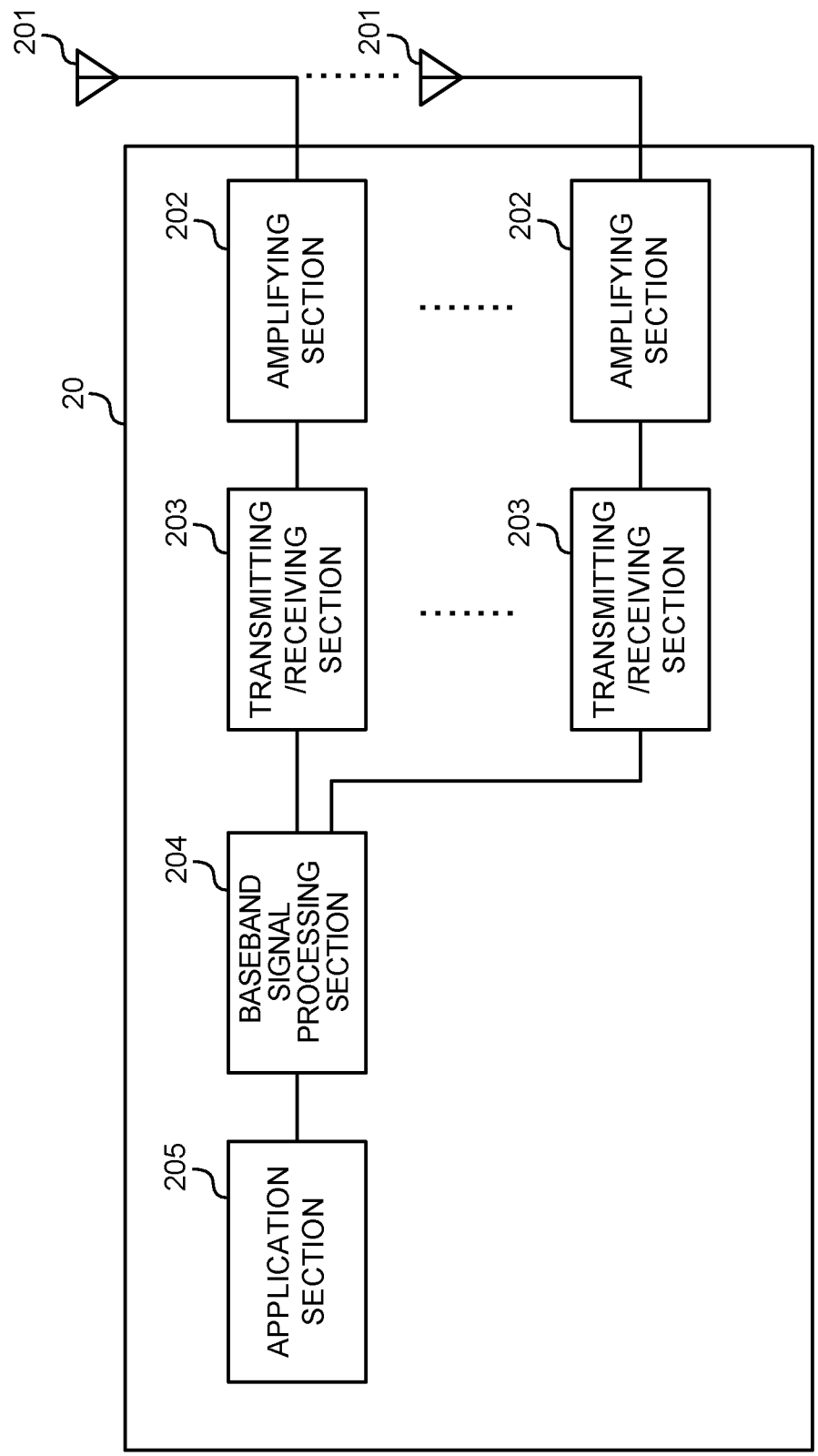
FIG. 18 is a diagram to show an example of an overall structure of a user terminal according to the present embodiment.

FIG. 18 is a diagram to show an example of an overall structure of a user terminal according to the present embodiment. A user terminal 20 has a plurality of transmitting/receiving antennas 201 for MIMO communication, amplifying sections 202, transmitting/receiving sections 203, a baseband signal processing section 204 and an application section 205.

Radio frequency signals that are received in the transmitting/receiving antennas 201 are amplified in the amplifying sections 202. The transmitting/receiving sections 203 receive the DL signals amplified in the amplifying sections 202. The received signals are subjected to frequency conversion and converted into the baseband signal in the transmitting/receiving sections 203, and output to the baseband signal processing section 204.

The baseband signal processing section 204 performs, for the baseband signal that is input, an FFT process, error correction decoding, a retransmission control receiving process and so on. The DL data is forwarded to the application section 205. The application section 205 performs processes related to higher layers above the physical layer and the MAC layer, and so on. Also, the broadcast information is also forwarded to application section 205.

Meanwhile, UL data is input from the application section 205 to the baseband signal processing section 204. The baseband signal processing section 204 performs a retransmission control transmission process (for example, an HARQ transmission process), channel coding, rate matching, puncturing, a discrete Fourier transform (DFT) process, an IFFT process and so on, and the result is forwarded to the transmitting/receiving sections 203. UCI is also subjected to at least one of channel coding, rate matching, puncturing, DFT process and IFFT process, and forwarded to each transmitting/receiving section 203.

Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Furthermore, the transmitting/receiving sections 203 receive DL signals (including DL data signals, DL control signals, DL reference signals and so forth) of the numerology configured in the user terminal 20, and transmit UL signals (including a UL data signal, a UL control signal, a UL reference signal, and so forth) based on this numerology.

In addition, the transmitting/receiving sections 203 transmit UCI to the radio base station 10 through a UL data channel (for example, PUSCH) or a UL control channel (for example, PUCCH). In addition, the transmitting/receiving section 203 may transmit information related to resource fields that serve as candidates for placing UL control channels of respective UL control channel structures (for example, first to third UL control channel field information), and/or specifying information for use when selecting UL control channel structures.

The transmitting/receiving sections 203 can be constituted by transmitters/receivers, transmitting/receiving circuits or transmitting/receiving apparatus that can be described based on general understanding of the technical field to which the present invention pertains. Furthermore, a transmitting/receiving section 203 may be structured as one transmitting/receiving section, or may be formed with a transmitting section and a receiving section.

Figure 19:
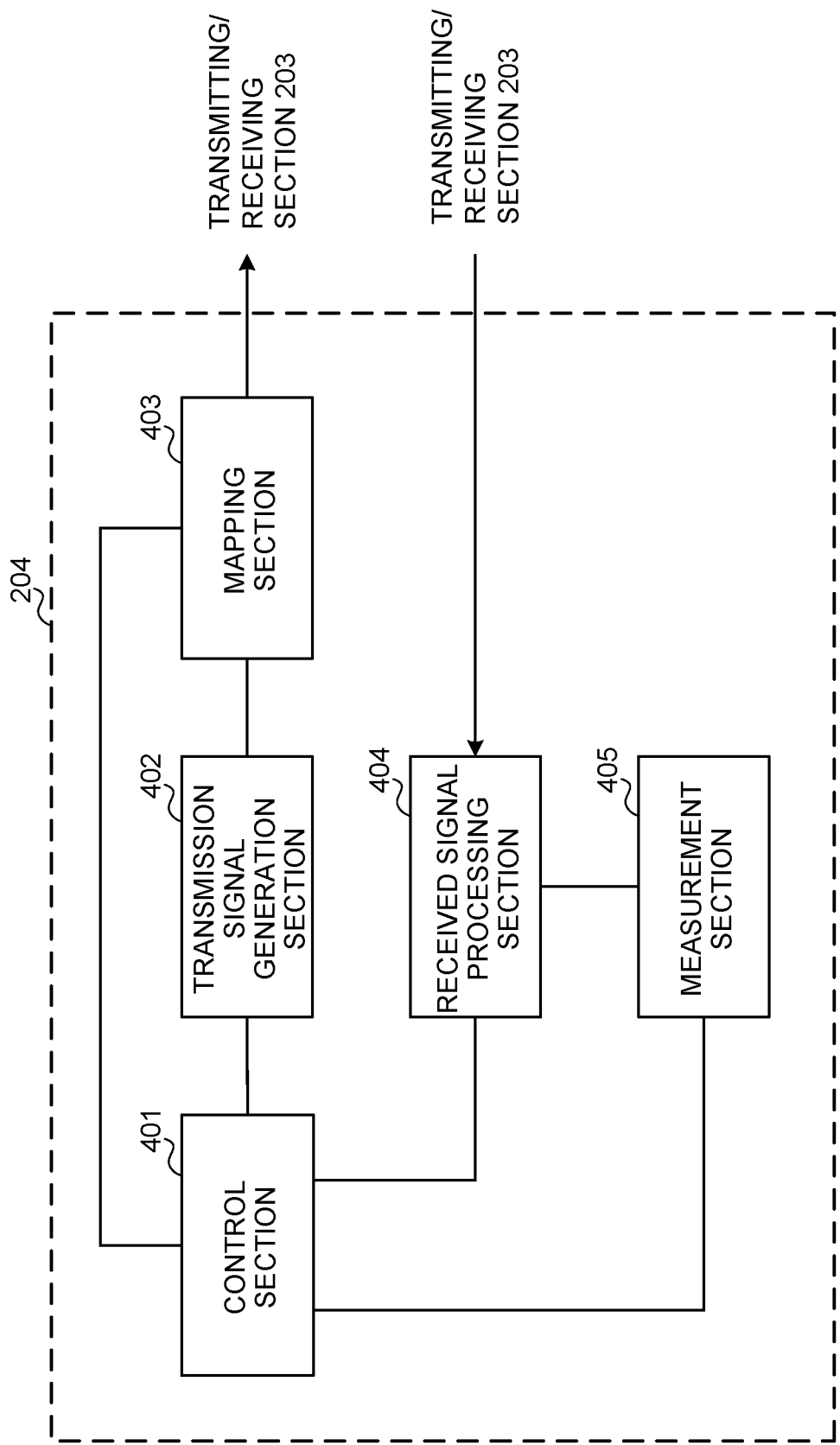
FIG. 19 is a diagram to show an example of a functional structure of a user terminal according to the present embodiment.

FIG. 19 is a diagram to show an example of a functional structure of a user terminal according to the present embodiment. Note that, although FIG. 19 primarily shows functional blocks that pertain to characteristic parts of the present embodiment, but a user terminal 20 may have other functional blocks that are necessary for radio communication as well. As shown in FIG. 19, the baseband signal processing section 204 provided in the user terminal 20 has a control section 401, a transmission signal generation section 402, a mapping section 403, a received signal processing section 404 and a measurement section 405.

The control section 401 controls the whole of the user terminal 20. The control section 401 controls, for example, generation of UL signals in the transmission signal generation section 402, mapping of UL signals in the mapping section 403, DL signal receiving processes in the received signal processing section 404, measurements in the measurement section 405, and so on.

In addition, the control section 401 selects the UL control channel structure to use to transmit UCI from the user terminal 20, from among a number of UL control channel structures. For example, the control section 401 may select the UL control channel structure based on specifying information from the radio base station 10. These UL control channel structures include the first UL control channel structure and the second/third UL control channel structure that have been described earlier.

The control section 401 also configures a resource field that serves as a candidate for placing a UL control channel of the selected UL control channel structure (for example, first to third UL control channel fields). The resource field may be specified explicitly by information transmitted via higher layer signaling and/or physical layer signaling, or may be configured in an implicit manner.

In addition, the control section 401 determines at least one of the time resource, the frequency resource, the code resource, and the frequency hopping pattern of the resource field, as the UCI-transmitting resource of that resource field. This transmission resource may be designated explicitly by information transmitted through higher layer signaling and/or physical layer signaling, or may be designated implicitly.

In addition, the control section 401 controls generation and/or transmission of UCI. To be more specific, the control section 401 may change the UCI to transmit depending on which UL control channel structure is selected. For example, the control section 401 may decide whether or not to include retransmission control information (ACK/NACK) in response to a DL data channel in UCI depending on which UL control channel structure is selected. The control section 401 may also decide whether or not to include retransmission control information in response to a DL data channel in UCI depending on in which subframe the DL data channel was transmitted (for example, the (n–x)-th subframe, the (n–x–y)-th subframe, and so forth).

In addition, the control section 401 may exert control so that at least part of the UCI is dropped depending on which UL control channel structure is selected. To be more specific, the control section 401 may drop at least part of the UCI based on at least one of the kind (for example, ACK/NACK, CSI or SR), the type, the index, and the priority of the UCI, so that the UCI stays within the selected UL control channel structure's payload.

For the control section 401, a controller, a control circuit or control apparatus that can be described based on general understanding of the technical field to which the present invention pertains can be used.

In the transmission signal generation section 402, UL signals (which may be UL data signals, UL control signals, UL reference signals and/and so on) are generated (including, for example, encoding, rate matching, puncturing, modulation, and so forth) based on commands from the control section 401, and output to the mapping section 403. The transmission signal generation section 402 can be constituted by a signal generator, a signal generating circuit or signal generating apparatus that can be described based on general understanding of the technical field to which the present invention pertains.

The mapping section 403 maps the uplink signals generated in the transmission signal generation section 402 to radio resources based on commands from the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding, and so forth) of DL signals (including DL data signals, scheduling information, DL control signals, DL reference signals, and so forth). The received signal processing section 404 outputs the information received from the radio base station 10, to the control section 401. The received signal processing section 404 outputs, for example, broadcast information, system information, high layer control information related to higher layer signaling such as RRC signaling, physical layer control information (L1/L2 control information) and so on, to the control section 401.

The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The measurement section 405 measures channel states based on reference signals (for example, CSI-RS) from the radio base station 10, and outputs the measurement results to the control section 401. Note that the channel state measurements may be conducted per CC.

The measurement section 405 can be constituted by a signal processor, a signal processing circuit or signal processing apparatus, and a measurer, a measurement circuit or measurement apparatus that can be described based on general understanding of the technical field to which the present invention pertains.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these multiple pieces of apparatus.

Figure 20:
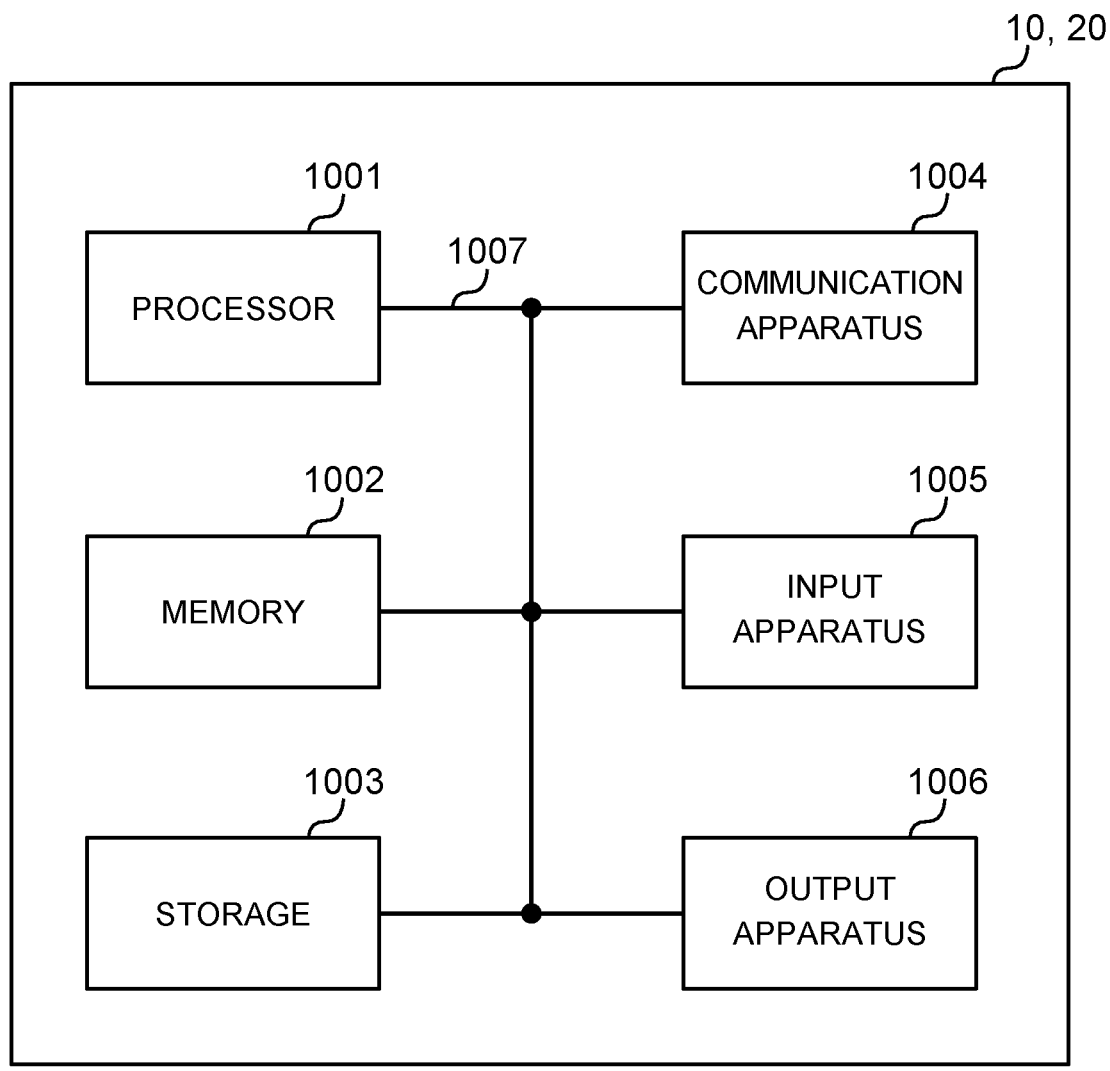
FIG. 20 is a diagram to show an example hardware structure of a radio base station and a user terminal according to the present embodiment.

For example, the radio base station, user terminals and so on according to one embodiment of the present invention may function as a computer that executes the processes of the radio communication method of the present invention. FIG. 20 is a diagram to show an example hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented either simultaneously or in sequence, or in different manners, on two or more processors. Note that the processor 1001 may be implemented with one or more chips.

Each function of the radio base station 10 and user terminal 20 is implemented by allowing predetermined software (programs) to the processor 1001 and the memory 1002, and by allowing the processor 1001 to do calculations, the communication apparatus 1004 to communicate, and the memory 1002 and the storage 1003 to read and/or write data.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, and so forth), a magnetic stripe, a database, a server, and/or other appropriate storage media. The storage 1003 may be referred to as "secondary storage apparatus."

The communication apparatus 1004 is hardware (transmitting/receiving apparatus) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and others, are connected by a bus 1007 for communicating information. The bus 1007 may be formed with a single bus, or may be formed with buses that vary between pieces of apparatus.

Also, the radio base station 10 and user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. Furthermore, a slot may be comprised of one or more symbols in the time domain (OFDM (Orthogonal Frequency Division Multiplexing) symbols, SC-FDMA (Single Carrier Frequency Division Multiple Access) symbols, and so on).

A radio frame, a subframe, a slot and a symbol all represent the time unit in signal communication. A radio frame, a subframe, a slot and a symbol may be each called by other applicable names. For example, one subframe may be referred to as a "transmission time interval (TTI)," or a plurality of consecutive subframes may be referred to as a "TTI," and one slot may be referred to as a "TTI." That is, a subframe and a TTI may be a subframe (1 ms) in existing LTE, may have a shorter period than 1 ms (for example, one to thirteen symbols), or may have a longer period than 1 ms.

Here, a TTI refers to the minimum time unit of scheduling in radio communication, for example. For example, in LTE systems, a radio base station schedules radio resources (such as the frequency bandwidth and transmission power that can be used in each user terminal) to allocate to each user terminal in TTI units. Note that the definition of TTIs is not limited to this. TTIs may be the time unit for transmitting channel-encoded data packets (transport blocks), or may be the unit of processing in scheduling, link adaptation and so on.

A TTI having a time duration of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "shortened subframe," a "short subframe," and so on.

A resource block (RB) is the unit of resource allocation in the time domain and the frequency domain, and may include one or a plurality of consecutive subcarriers in the frequency domain. Also, an RB may include one or more symbols in the time domain, and may be one slot, one subframe or one TTI in length. One TTI and one subframe each may be comprised of one or more resource blocks. Note that an RB may be referred to as a "physical resource block (PRB (Physical RB))," a "PRB pair," an "RB pair," and so on.

Furthermore, a resource block may be comprised of one or more resource elements (REs). For example, one RE may be a radio resource field of one subcarrier and one symbol.

Note that the above-described structures of radio frames, subframes, slots, symbols and so on are merely examples. For example, configurations such as the number of subframes included in a radio frame, the number of slots included in a subframe, the number of symbols and RBs included in a slot, the number of subcarriers included in an RB, the number of symbols in a TTI, the symbol duration and the cyclic prefix (CP) duration can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, in a memory), or may be managed in a control table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information, or by reporting a different piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads)). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a number of user terminals (D2D (Device-to-Device)). In this case, user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by higher nodes (upper nodes). In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark) and other adequate radio communication methods, and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method of distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. For example, "connection" may be interpreted as "access." As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency fields, microwave regions and/or optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2016-157994, filed on Aug. 10, 2016, including the specification, drawings and abstract, is incorporated herein by reference in its entirety.

The invention claimed is:

1. A terminal comprising:
   a transmitter that transmits uplink control information (UCI) by using an uplink (UL) control channel; and
   a processor that controls mapping of a modulated symbol of the UCI to a resource element that is not used for a demodulation reference signal in a resource block assigned for the UL control channel,
   wherein the processor applies rate matching to UCI bits based on a number of subcarriers to which the modulated symbol of the UCI is mapped,
   wherein the processor determines a pattern of frequency hopping per symbol, applied to the modulated symbols of the UCI, based on information received by higher layer signaling, and
   wherein the information, received by the higher layer signaling, indicates resource blocks assigned for the UL control channel.

2. The terminal according to claim 1, wherein the processor controls mapping of the demodulation reference signal to a given resource element in the resource block.

3. The terminal according to claim 1, wherein the UL control channel is formed with one or two symbols.

4. The terminal according to claim 1, wherein the processor controls mapping of the modulated symbol of the UCI in a symbol where the demodulation reference signal is mapped in the resource block.

5. A radio communication method for a terminal comprising:
   transmitting uplink control information (UCI) by using an uplink (UL) control channel;
   controlling mapping of a modulated symbol of the UCI to a resource element that is not used for a demodulation reference signal in a resource block assigned for the UL control channel;
   applying rate matching to UCI bits based on a number of subcarriers to which the modulated symbol of the UCI is mapped; and
   determining a pattern of frequency hopping per symbol, applied to the modulated symbols of the UCI, based on information received by higher layer signaling, and
   wherein the information, received by the higher layer signaling, indicates resource blocks assigned for the UL control channel.

6. A base station comprising:
   a receiver that receives uplink control information (UCI) by using an uplink (UL) control channel; and
   a processor that controls reception of the UCI of which a modulated symbol is mapped to a resource element that is not used for a demodulation reference signal in a resource block assigned for the UL control channel,
   wherein the UCI is rate matched to UCI bits based on a number of subcarriers to which the modulated symbol of the UCI is mapped,
   wherein a pattern of frequency hopping per symbol, applied to the modulated symbols of the UCI, is determined based on information transmitted by higher layer signaling, and
   wherein the information, received by the higher layer signaling, indicates resource blocks assigned for the UL control channel.

7. The terminal according to claim 2, wherein the UL control channel is formed with one or two symbols.

8. The terminal according to claim 2, wherein the processor controls mapping of the modulated symbol of the UCI in a symbol where the demodulation reference signal is mapped in the resource block.

9. The terminal according to claim 3, wherein the processor controls mapping of the modulated symbol of the UCI in a symbol where the demodulation reference signal is mapped in the resource block.

10. A system comprising a terminal and a base station, wherein:
   the terminal comprises:
      a transmitter that transmits uplink control information (UCI) by using an uplink (UL) control channel; and
      a processor of the terminal that controls mapping of a modulated symbol of the UCI to a resource element that is not used for a demodulation reference signal in a resource block assigned for the UL control channel; and
   the base station comprises:
      a receiver that receives the UCI by using the UL control channel; and
      a processor of the base station that controls reception of the UCI of which the modulated symbol is mapped to the resource element that is not used for the demodulation reference signal in the resource block assigned for the UL control channel; and
   wherein the processor of the terminal applies rate matching to UCI bits based on a number of subcarriers to which the modulated symbol of the UCI is mapped,
   wherein the processor of the terminal determines a pattern of frequency hopping per symbol, applied to the modulated symbols of the UCI, based on information received by higher layer signaling, and
   wherein the information, received by the higher layer signaling, indicates resource blocks assigned for the UL control channel.

* * * * *